United States Patent [19]
Aoki

[11] Patent Number: 5,889,632
[45] Date of Patent: Mar. 30, 1999

[54] CASSETTE LOADING APPARATUS

[75] Inventor: Osamu Aoki, Kanagawa, Japan

[73] Assignee: Sony Corporation, Tokyo, Japan

[21] Appl. No.: 832,764

[22] Filed: Apr. 4, 1997

[30] Foreign Application Priority Data

Apr. 4, 1996 [JP] Japan .................................... 8-082206

[51] Int. Cl.[6] .............................................. G11B 15/675
[52] U.S. Cl. .......................................... 360/94; 360/96.5
[58] Field of Search .............................. 360/94, 96.5, 95, 360/85, 93

[56] References Cited

U.S. PATENT DOCUMENTS

| | | | |
|---|---|---|---|
| 4,484,240 | 11/1984 | Yoshida | 360/96.5 |
| 4,802,037 | 1/1989 | Tanaka et al. | 360/96.5 |
| 5,046,169 | 9/1991 | Tsujino | 360/96.5 |
| 5,082,195 | 1/1992 | Saito et al. | 360/94 X |
| 5,314,141 | 5/1994 | Ishii et al. | 360/94 X |
| 5,396,381 | 3/1995 | Yamano et al. | 360/96.5 |
| 5,583,718 | 12/1996 | Kobayashi | 360/94 |
| 5,677,810 | 10/1997 | Lee | 360/94 |

*Primary Examiner*—William J. Klimowicz
*Attorney, Agent, or Firm*—Jay H. Maioli

[57] ABSTRACT

A cassette loading apparatus includes a cassette container, an identifier having different positions corresponding to different kinds of cassettes that can be inserted into the cassette container, and a driver adjustable to different positions corresponding to the different kinds of cassettes. The apparatus also includes a blocking mechanism selectively operable to prohibit travel of the cassette container to a cassette loading position.

10 Claims, 26 Drawing Sheets

CASSETTE LOADING APPARATUS

FIELD OF THE INVENTION

The present invention relates to cassette loading apparatuses of the so-called pop-up types, which allow insertion of a cassette into a cassette container that is pressed down to bring the cassette into driving relation with a driver for turning operation of the cassette.

BACKGROUND OF THE INVENTION

In cassette loading apparatuses of the pop-up type, inserting a cassette into a cassette container that is in a pop-up state and applying a downward force to the cassette container brings the cassette into driving relation with a driver disposed under the cassette. This allows the driver to turn a recording medium contained in the cassette during playback or record operational modes.

The cassette loading apparatuses of the above type may be divided into two design categories. A first design category is for exclusive use of a standard sized cassette and a second design category is for wide use not only of the standard sized cassette but also of cassettes of other sizes.

In the cassette loading apparatus that is designed for wide use of standard and other size cassettes, inserting a cassette into a cassette container activates a cassette detecting sensor. This sensor detects the insertion of the cassette and the size thereof, causing a driver positioning mechanism to automatically adjust the position of the driver to the position of a follower on the cassette.

After completion of the adjustment, pressing down the cassette container brings the follower on the cassette into driving relation with the driver. in the cassette loading apparatus that is designed for exclusive use of the standard size cassette, a driver is held stationary and cassettes that may be used are limited to one size. Thus, even if the cassette loading apparatus is disconnected from a source of power, inserting a cassette of the standard size into a cassette container and pressing down the cassette container will bring a follower on the cassette into driving relation with a driver without any operation to adjust the driver with respect to the follower. In other words, there is no potential problem that inappropriate alignment of the follower with the driver might damage the cassette and/or driver.

The cassette loading apparatus designed for is wide use of standard and other size cassettes, has a potential problems because the driver can move for adjustment to a cassette of the size different from the standard size, Let us now consider the case where the driver positioning mechanism is not ready for action because of disconnection of the loading apparatus from the source of power. Under this condition, if, with the driver adjusted to the standard size cassette, a cassette of different size is inserted into the cassette container, manually pressing down the cassette container will bring the cassette into contact with the driver that is not aligned with the cassette. This interference may bring about damage to the cassette or driver.

An object of the present invention is to solve the above-mentioned potential problem in the cassette loading apparatuses that are designed for wide use of standard and other size cassettes.

SUMMARY OF THE INVENTION

According to one aspect of the invention, there is provided a cassette loading apparatus including:

a cassette container including an identifier, the identifier having different positions corresponding to different kinds of cassettes that can be inserted into the cassette container;

a driver adjustable to different positions corresponding to the different kinds of cassettes; and a blocking mechanism selectively operable to prohibit travel of the cassette container to a cassette loading position with respect to the driver.

DESCRIPTION OF THE PREFERRED EMBODIMENT

Referring to FIGS. 1 to 30, the cassette loading apparatus according to an embodiment the present invention is described. In the preferred embodiment to be described below, there is illustrated, as an example, is a cassette loading apparatus that is designed for use of tape cassettes of two different sizes. The present invention is not limited to this example. The present invention can be embodied in a cassette loading apparatus that is desired for use of tape cassettes of more than two different sizes or in a cassette loading apparatus that is designed for use of cassettes other than tape cassettes.

Figure 12:
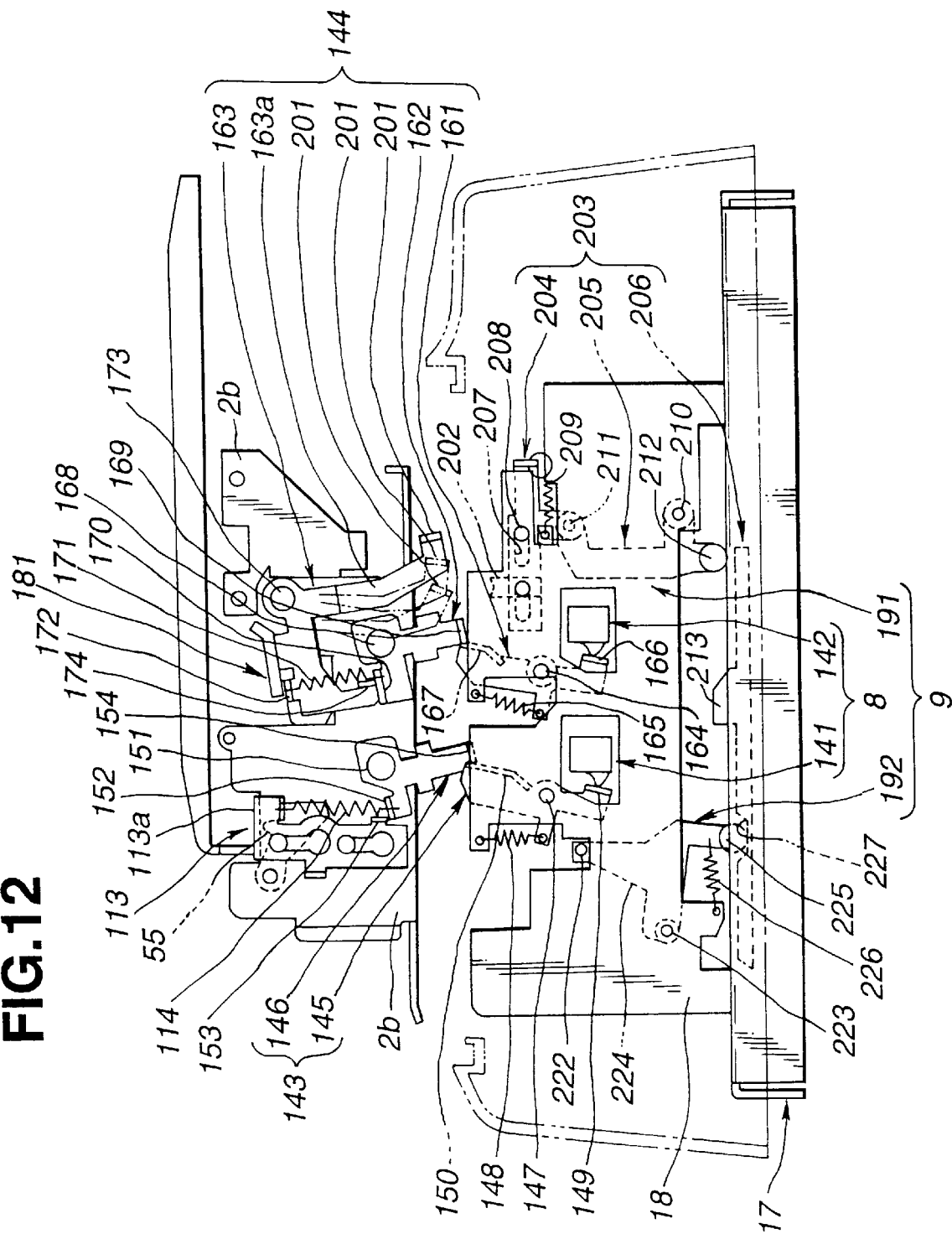
FIG. 12 is a side view of a main portion of the pop-up cassette loading apparatus according to an embodiment of the present invention.
Figure 13:
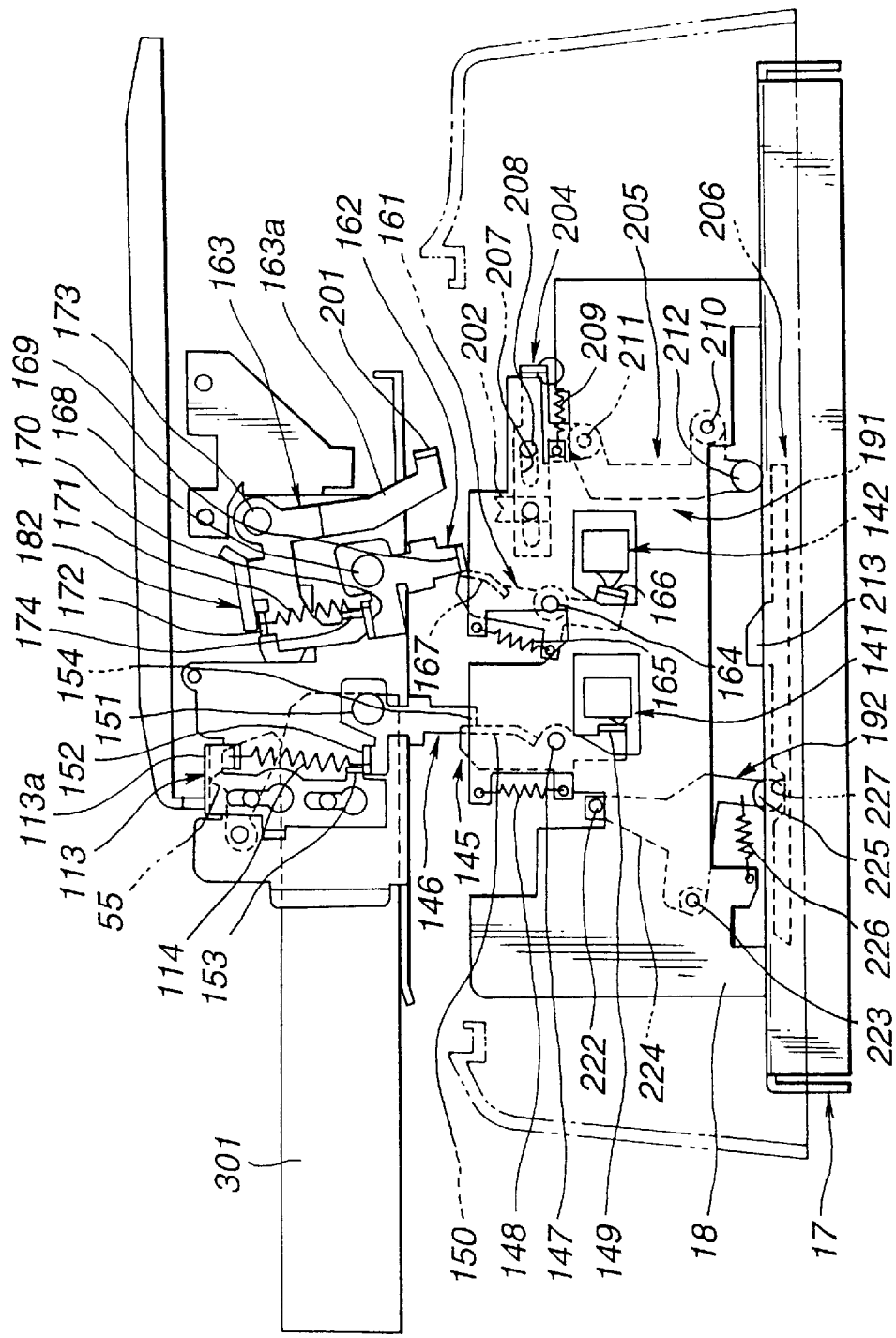
FIG. 13 is a side view illustrating a condition in which a first cassette detect switch for a standard size magnetic tape cassette has been activated.

The cassette loading apparatus, which is now generally designated by the reference numeral 1, is provided with a cassette container 2, first and second pantograph-like mechanisms 3 and 4, and a pair of capstans 5 and 6. The cassette container 2 can receive a tape cassette 301 of a standard size or a tape cassette 401 of a smaller size to place the cassette at an appropriate mounting position. The pantograph-like mechanisms 3 and 4 are arranged on opposite sides of the cassette container 2. The mechanisms 3 and 4 support vertical movements of the cassette container 2 to and from a pop-up position thereof. The capstans 5 and 6 are arranged under the cassette container 2 such that they support a pair of reels R1 and R2 of a tape cassette received in the cassette container 2 when the cassette container 2 is pressed down. The cassette loading apparatus 1 is provided also with a cassette guide 7, a cassette identifier 8 (see FIG. 12) and a blocking mechanism 9 to prohibit downward movement of the cassette container 2. The cassette guide 7 guides the small size tape cassette 401 to an appropriate position in the cassette container 2. As shown in FIG. 12, the cassette identifier 8 detects insertion of a tape cassette into a cassette container 2 and determines whether or not the inserted tape cassette is of the standard size. The blocking mechanism 9 prohibits downward movement of the cassette container 2 if the reels R1 and R2 of the inserted tape cassette are not aligned with the capstans 5 and 6. The first and second pantograph-like mechanisms 3 and 4, cassette guide 7, cassette identifier 8 and blocking mechanism 9 are described below one after another in this order.

Description of First and Second Pantograph-like Mechanisms 3 and 4.

The first pantograph-like mechanism 3, which is arranged on one side (on the right side as viewed in FIG. 1) of the cassette container 2, includes two pivotal arms, namely a first pivotal arm 13 and a second pivotal arm 14. The first pivotal arm 13 has at one end portion thereof (a left end as viewed in FIG. 1) an arched elongate shaft-receiving hole 15 that receives a shaft 16. With this shaft 16, the first pivotal arm 13 is connected at one end portion thereof to a first side plate 18 that stands on a chassis 17 for pivotal motion about the shaft 16 and motion toward the shaft 16 within a range defined by the arched elongate shaft-receiving hole 15. At the opposite end portion thereof (a right end as viewed in FIG. 1), the first pivotal arm 13 is pivotally connected via a shaft 19 to the cassette container 2 at one side portion thereof.

The second pivotal arm 14 has at one end portion thereof (a left end as viewed in FIG. 1) an arched elongate shaft-receiving hole 20 that receives a shaft 21. With this shaft 21, the second pivotal arm 14 is connected to the cassette container 2 at the one side thereof for pivotal motion about the shaft 21 and motion toward the shaft 21 within a range defined by the arched elongate shaft-receiving hole 20. At the opposite end portion thereof (a right end as viewed in FIG. 1), the second pivotal arm 14 is pivotally supported via a shaft 22 by the first side plate 18 that stands on the chassis 17. The first and second pivotal arms 13 and 14 are crossed to form a X-shaped configuration and they are interconnected at the crossed portion by a shaft 23.

Figure 1:
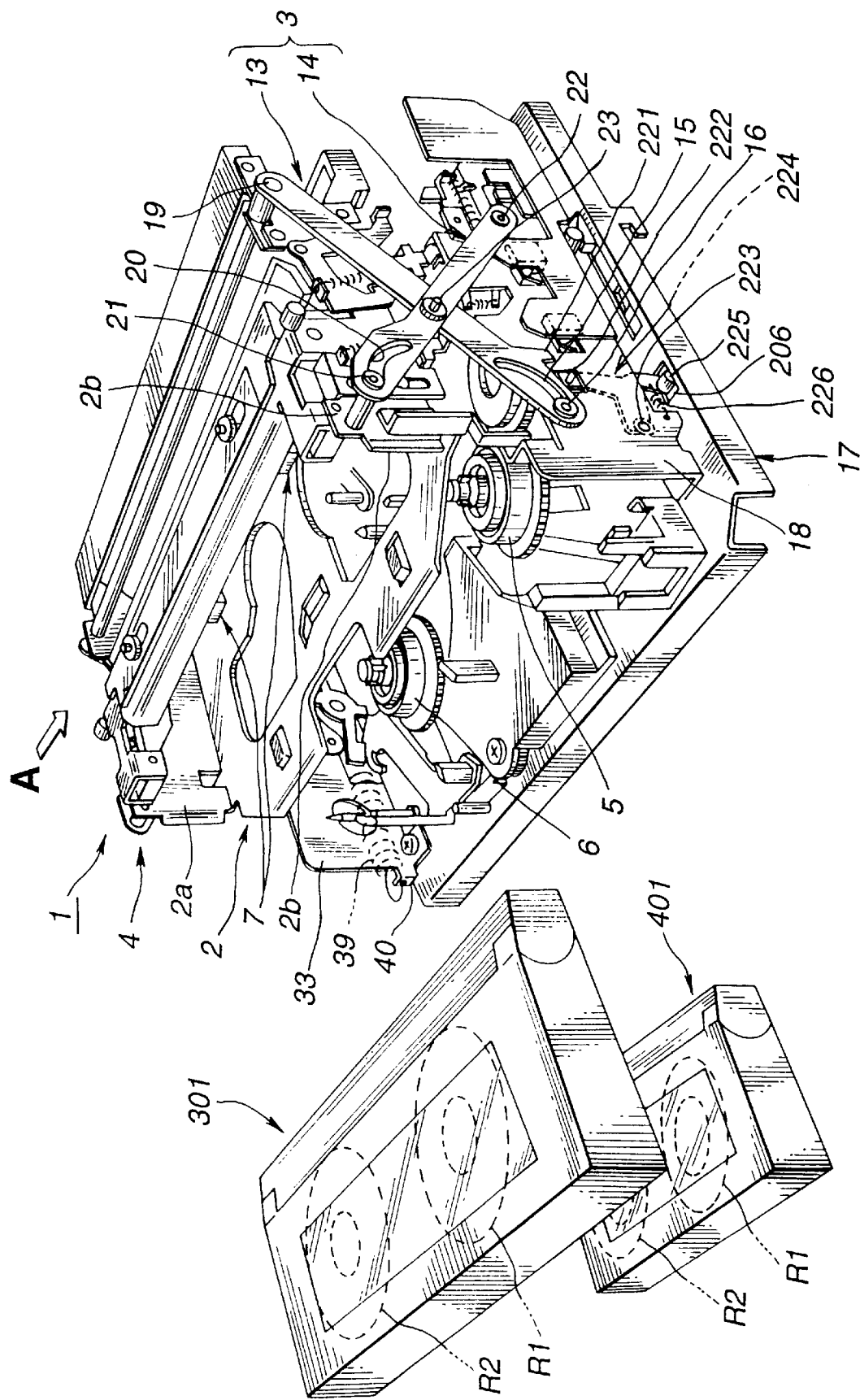
FIG. 1 is a perspective view of the pop-up cassette loading apparatus according to an embodiment of the present invention as well as large and small format magnetic tape cassettes.
Figure 2:
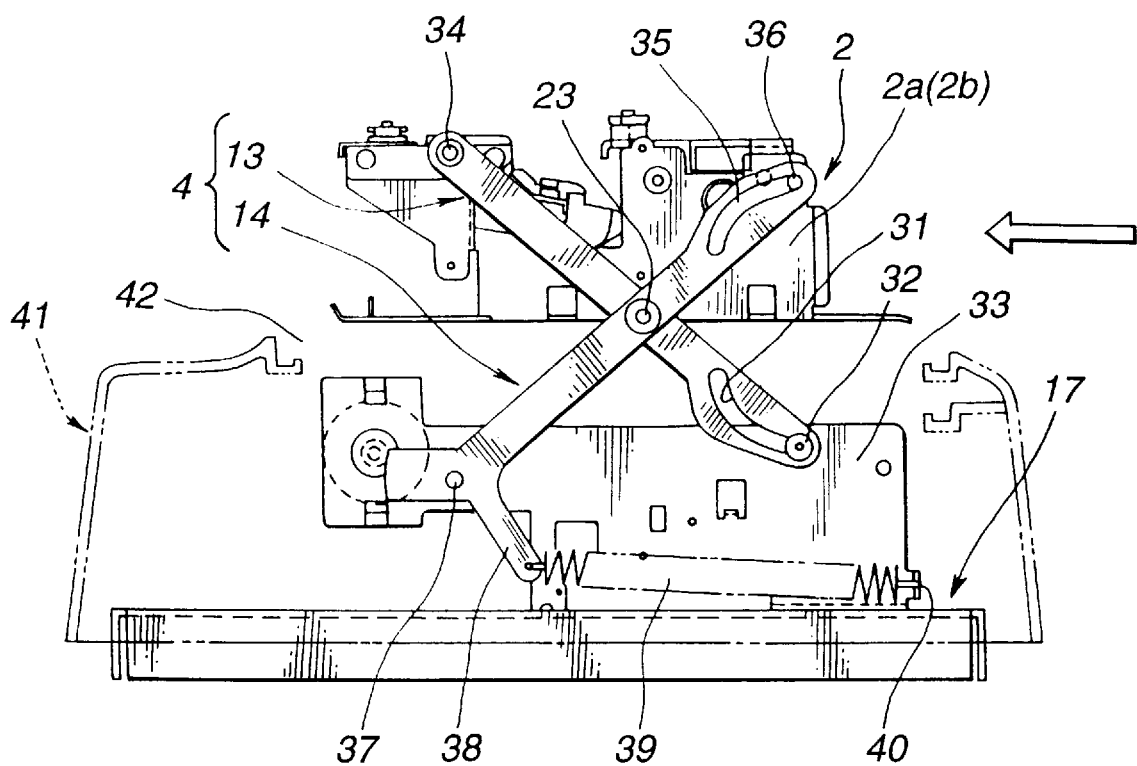
FIG. 2 is a cross-sectional view of the apparatus of FIG. 1 as viewed from the direction of arrow A of FIG. 1.

The explain the second pantograph-like mechanism 4, which is arranged on the left side of the cassette container 2 as viewed in FIG. 1 will now be described by reference to FIG. 2. FIG. 2 shows that the second pantograph-like mechanism 4 includes two pivotal arms, namely a first pivotal arm 13 and a second pivotal arm 14.

The first pivotal arm 13 has at one end portion thereof (a right end as viewed in FIG. 2) an arched elongate shaft-receiving hole 31 that receives a shaft 32. With this shaft 32, the first pivotal arm 13 is connected at one end portion thereof to a second side plate 33 that stands on a chassis 17 for pivotal motion about the shaft 32 and motion toward the shaft 32 within a range defined by the arched elongate shaft-receiving hole 31. At the opposite end portion thereof (a left end as viewed in FIG. 2), the first pivotal arm 13 is pivotally connected to the cassette container 2 via shaft 34, at the opposite side portion thereof which is remote from the first pantograph mechanism 3.

The second pivotal arm 14 has at one end portion thereof (a right end as viewed in FIG. 2) an arched elongate shaft-receiving hole 35 that receives a shaft 36. With this shaft 36, the second pivotal arm 14 is connected to the cassette container 2 at the opposite side thereof for pivotal motion about the shaft 36 and motion toward the shaft 36 within a range defined by the arched elongate shaft-receiving hole 35. At the opposite end portion thereof (a left end as viewed in FIG. 2), the second pivotal arm 14 is pivotally supported via a shaft 37 by the second side plate 33 that stands on the chassis 17. The first and second pivotal arms 13 and 14 are crossed to form a X-shaped configuration and they are interconnected at the crossed portion by a shaft 23. The second arm 14 has a spring retainer arm 38 projecting from a portion adjacent the shaft 37. The spring retainer arm 38 is engaged at its free end portion with one end of a coil spring 39 for pop-up action, At the opposite end thereof, the coil spring 39 engages a spring retainer portion 40 formed on the second side plate 33.

The coil spring 39 pulls the spring retainer arm 38 thereby rotating the second pivotal arm 14, about the shaft 37, counterclockwise, as viewed in FIG. 2, and rotating the first pivotal arm 13 clockwise. This causes the first and second pivotal arms 13 and 14 of the fist pantograph-like mechanism 3 to rotate in a similar manner thereby lifting the container 2 to project outwards through an aperture 42 of a cabinet 41.

Inserting a tape cassette into the cassette container 2 in the direction indicated by arrow A and then pressing down the cassette container 2 will cause the second pivotal arm 14 of the second pantograph-like mechanism 4 to rotate clockwise and the first pivotal arm 13 to rotate counterclockwise against the bias spring force of coil spring 39. This also causes the first and second pivotal arms 13 and 14 of the first pantograph-like mechanism 3 to rotate in a similar manner to their counterparts of the second pantograph-like mechanism 4. This allows downward movement of the cassette container 2, permitting the reels of the tape cassette to fit around the respective capstans. When the cassette container 2 is pressed down to a predetermined position, the cassette container 2 is held in the pressed-down predetermined position by a lock mechanism (not illustrated). When subsequently released from the predetermined position, the cassette container 2 is automatically lifted by the spring force of the coil spring 39 to project through the aperture 42 of the cabinet 41.

Description of Cassette Guide 7

As mentioned before, the cassette container 2 is designed in size for the standard size cassette 301. Thus, laterally spaced left and right side plates 2a and 2b of the cassette container 2 function to guide the tape cassette 301 to hold it at a preset centered position within the cassette container 2 upon insertion of the standard size tape cassette 301. However, these side plates 2a and 2b do not serve as the appropriate guide for centering the small size tape cassette 401 within the cassette container 2. The cassette guide 7 is designed for centering the small size tape cassette 401 within the cassette container 2 upon insertion of the small size tape cassette 401.

AS shown FIG. 3, the cassette guide 7 is provided with a pair of left and right guide members (hereinafter referred to as first and second guide members, respectively) 51 and 52, a pair of left and right lock members (hereinafter referred to as first and second lock members, respectively) 53 and 54, and a pair of left and right lock release members (hereinafter referred to as first and second lock release members, respectively) 55 and 56.

The first and second guide members 51 and 52 can move so as not to interfere with insertion of the standard size tape cassette 301, but can engage laterally spaced side faces of the small size tape cassette 401 to limit lateral movement thereby to center the tape cassette 401 within the cassette container 2 upon insertion of the small size tape cassette 401. The first and second lock members 53 and 54 are arranged to hold the first and second guide members 51 and 52 at the appropriate positions to guide the small size tape cassette 401. The first and second lock release members 55 and 56 are pressed operable upon insertion of the standard size tape cassette 301 to release the first and second lock members 53 and 54, respectively.

The first guide member 51 is supported by a guide support plate 61 arranged on an upper portion of the cassette container 2. The first guide member 51 is pivotally connected via a shaft 64 to a pair of bearing pieces 62 and 63 that are formed by pressing portions of the support plate 61 to extend downward from a lower surface thereof. A torsion spring 65 imparts a torque to the first guide member 51 for clockwise (as viewed in FIG. 3) rotation about the shaft 64. The clockwise rotation of the first guide member 51 is limited by engagement of a stopper 66, which is formed on one end portion of the guide member 51, with the bearing piece 62 thereby preventing further rotation to hold the guide member 51 generally normal to the chassis 2. Counterclockwise rotation of the first guide member 51 is prohibited by engagement of a front face 51b thereof with the first lock member 53. With its rotation restrained, the first guide member 51 defines, at its inner side face 51a, the position of a left side face of the small size tape cassette 401.

Similarly to the first guide member 51, the second guide member 52 is supported by the guide support plate 61 arranged on the upper portion of the cassette container 2. The second guide member 52 is pivotally connected via a shaft 73 to a pair of bearing pieces 71 and 72 that are formed by pressing portions of the support plate 61 to extend downward from the lower surface thereof. A torsion spring 74 imparts a torque to the second guide member 52 for clockwise, (as viewed in FIG. 3) rotation about the shaft 73. The clockwise rotation of the second guide member 52 is limited by engagement of a stopper 75, which is formed on one end portion of the guide member 52, with the bearing piece 71 thereby preventing further rotation to hold the guide member 52 generally normal to the chassis 2. Counterclockwise rotation of the second guide member 52 is prohibited by engagement of a front face 52b thereof with the second lock member 54. With its rotation restrained, the second guide member 52 defines, at it inner side face 52a, the position of a right side face of the small size tape cassette 401.

The first lock member 53 is formed on one side portion of a first slide plate 81. When the slide plate 61 is superimposed over an upper face of the guide support plate 61, the first lock member 53 extends though a window 82 that has been opened upon forming the bearing piece 63.

The first slide plate 81 is formed with a plurality, two in this embodiment, of spaced slide guide holes 83 in the form of elongate holes, respectively, These slide guide holes 83 allow insertion of slide guide pins 84 which are formed on the upper face of the cassette guide support plate 61 thereby allowing sliding movement of the first slide plate 81 on the upper face of the cassette guide support plate 61 within a range defined by the length of each of the slide guide holes 83. The first slide plate 81 is formed on its lower face with a spring retaining anchor 85. When the first slide plate 81 is superimposed over the upper face of the cassette support plate 61, the spring retaining anchor 85 extends downwards through an elongate hole 86 of the cassette guide support plate 61. A coil spring 87 engages at one end thereof with the spring retaining anchor 65 for biasing the first slide plate 81 until the slide guide holes 83 are engaged at their right ends by the slide guide pins 84, respectively.

In a state when the first slide plate 81 has moved to its leftmost (as viewed in FIG. 3) position, the first lock member 53 engages the front face 51b of the upper portion of the guide member 51 thereby preventing the guide member 51 from rotating counterclockwise.

Figure 3:
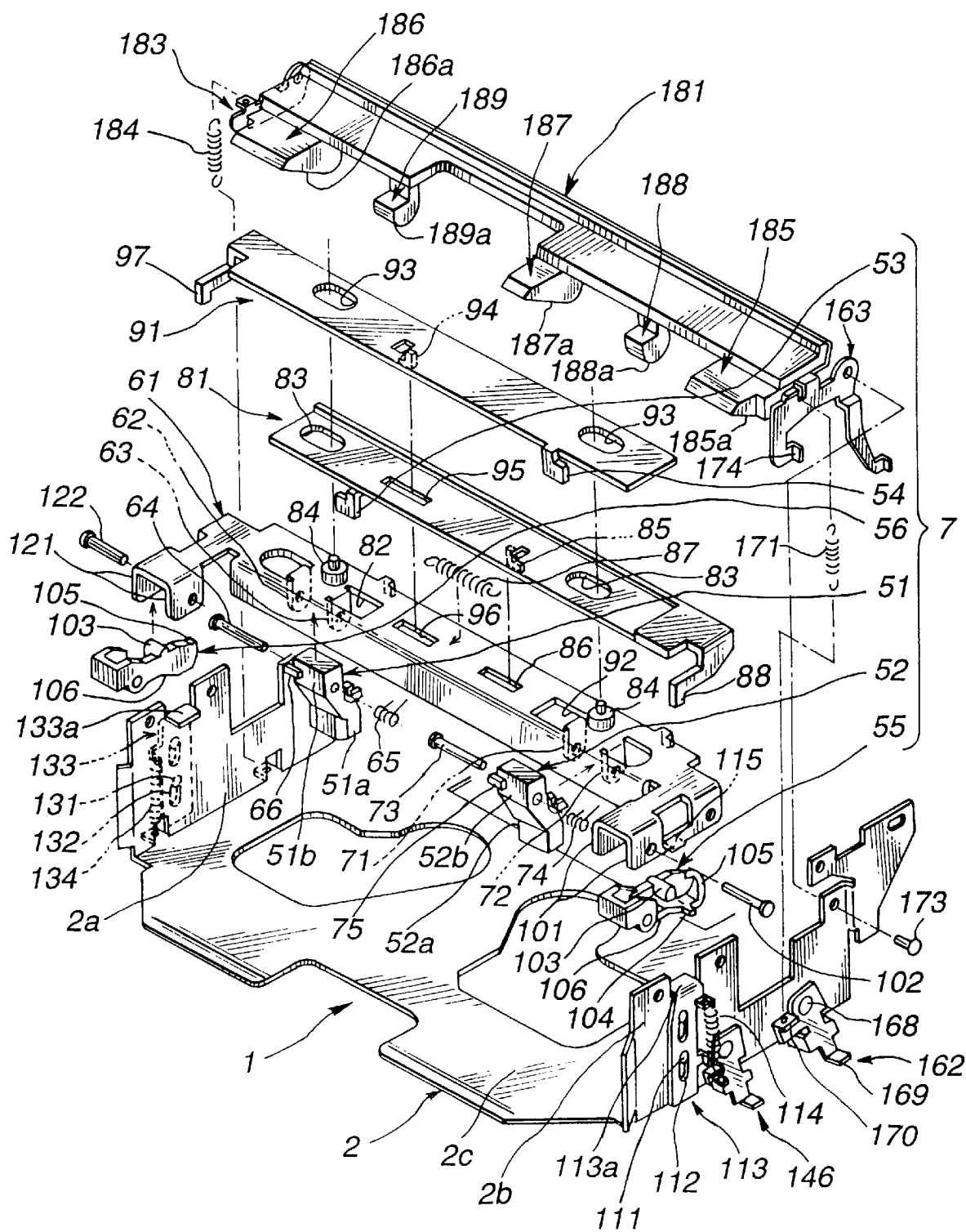
FIG. 3 is an exploded perspective view of a main portion of the pop-up cassette loading apparatus according to an embodiment of the present invention.

The engagement of the first lock member 53 with the guide member 51 is released when the first lock release member 55 moves the first slide plate 81 against the spring force of the coil spring 87 to the right as viewed in FIG. 3 thereby allowing the first guide member 51 to rotate counterclockwise. The first slide plate 51 is formed at one end portion (its right end portion as viewed in FIG. 3) with a portion 88 arranged for engagement with the first lock release member 55 that will be described in detail later.

The second lock member 54 is formed on one side portion of a second slide plate 91. When the slide plate 91 is superimposed over an upper face of the first slide plate 81, the second lock member 54 extends though a window 92 that has been opened upon forming the bearing piece 71.

The second slide plate 91 is formed with a plurality, two in this embodiment, of spaced slide guide holes 93 in the form of elongate holes, respectively. These slide guide holes 93 allow insertion of the above-mentioned slide guide pins 84, respectively, thereby allowing sliding s movement of the second slide plate 91 on the upper face of the first slide plate 81 within a range defined by the length of each of the slide guide holes 93. The second slide plate 91 is formed on its lower face with a spring retaining anchor 94. When the second slide plate 91 is superimposed over the upper face of the first slide plate 81, the spring retaining anchor 94 extends downwards through an elongate hole 95 of the first slide plate 81 and an elongate hole 96 of the cassette guide support plate 61. The coil spring 87, which engages at one end thereof with the spring retaining anchor 85, engages at the other end portion thereof with the spring retaining anchor 94 for biasing the second slide plate 91 until the slide guide holes 93 are engaged at their left ends by the slide guide pins 84, respectively.

In a state when the second slide plate 91 has moved to its rightmost (as viewed in FIG. 3) position, the second lock member 54 engages the front face 52b of the upper portion of the second guide member 52 thereby preventing the second guide member 52 from rotating counterclockwise.

The engagement of the second lock member 54 with the second guide member 52 is released when the second lock release member 56 moves the second slide plate 91 against the spring force of the coil spring 87 to the left as viewed in FIG. 3 thereby allowing the second guide member 52 to rotate counterclockwise. The second slide plate 91 is formed at one end portion (its left end portion viewed in FIG. 3) with a portion 97 arranged for engagement with the second lock release member 56 that will be described in detail later.

Next, the first and second lock release members 55 and 56 are described. The first and second guide members 51 and 52 project through the cassette container 2 from an upper surface thereof toward a lower surface thereof and they are held stationary by the first and second lock members 53 and 54, respectively, thus preventing entry of the standard size tape cassette 301. This is because the standard size tape cassette 301 is thicker than the small size tape cassette 401. Nevertheless, the first and second lock release members 55 and 56 are operable upon insertion of the standard size tape cassette 301 to release engagement of the first and second lock members 53 and 54 with the first and second guide members 51 and S2 thereby allowing the first and second guide members 51 and 52 to rotate. The first lock release member 55 releases the first lock member 53, while the second lock release member 56 releases the second lock member 54.

The first lock release member 55 is attached to an upper portion of the cassette container 2 at a portion that is in front of the second guide member 52 with respect to an inserting direction of the cassette and displaced laterally outwards. The first lock release member 55 is pivotally connected via a shaft 102 to a bearing portion 101 that is formed on one end portion (a right end portion as viewed in FIG. 3) of the cassette guide support plate 61.

The first lock release member 55 has at an upper portion thereof a portion 103 for engagement with an operation plate. At a lower portion thereof, the first lock release member 55 has a protrusion 104 for limiting rotation thereof. At an outer side face thereof, the first lock release member 55 has a slide plate manipulating surface 105 which contacts with a leading end of the engaging portion 88 that is formed on one end portion of the first slide plate 81, At a lower face thereof, the first lock release member 55 has a cassette contacting surface 106 that is arranged to be contacted by a leading end of the standard size tape cassette 301 when it is inserted into the cassette container 2. The operation plate engagement portion 103 is engaged by a hook portion 113a of a first operation plate 113 that is attached to one of the side plates (the right side plate as viewed in FIG. 3) of the cassette container 2 for vertical movement with a side guide pin 111 received in a slide guide hole 112.

A coil spring 114 pulls down the first operation plate 113 thereby urging the hook portion 113a to impart torque to the first lock release member 55 for clockwise rotation about the shaft 102. The protrusion 104 abuts a stopper 115 provided inside of the baring portion 101 to prevent further clockwise rotation of the first lock release member 55, which is subjected to clockwise torque by coil spring 114 and the first operation plate 113, to hold it in a generally horizontal state.

The slide plate operation surface 105, which is formed on one side face of the first lock release member 55, has a slope so inclined downwards as to approach the above-mentioned side plate 2b. Rotating counterclockwise the first lock release member 55 against the bias force of the coil spring 114 moves the first slide plate 81 against the bias of the coil spring 87 to the right, as viewed in FIG. 3, thereby releasing engagement of the first lock member 53 with the first guide member 51. The cassette contacting surface 106 is a slope that is so inclined in the inserting direction of the tape cassette as to gradually approach the bottom plate 2c of the cassette container 2. Upon insertion into the cassette container 2, the standard size tape cassette 301 presses at its 30 leading end the cassette contacting surface 106, causing counterclockwise rotation of the first lock release member 55 thereby causing the slide plate operation surface 105 to move the first slide plate 81 to the right as viewed in FIG. 3. This results in release of engagement of the first lock member 53 with the first guide member 51.

The second lock release member 56 is attached to the upper portion of the cassette container 2 at a portion that is in front of the first guide member 51 with respect to the inserting direction of the cassette and displaced laterally outwards. The second lock release member 36 is pivotally connected via a shaft 122 to a bearing portion 121 that is formed on one end portion (a left end portion as viewed in FIG. 3) of the cassette guide support plate 61.

Similarly to the first lock release member 55, the second lock release member 56 has at an upper portion thereof a portion 103 for engagement with an operation plate. At a lower portion thereof, the second lock release member 56 has a protrusion (not illustrated) for limiting rotation thereof. At an outer side face thereof, the first lock release member 55 has a slide plate manipulating surface 105 which contacts with a leading end of the engaging portion 97 that is formed on one end portion of the second slide plate 91. At a lower face thereof, the second lock release member 56 has a cassette contacting surface 106 that is arranged to be contacted by the leading end of the standard size tape cassette 301 when it is inserted into the cassette container 2. The operation plate engagement portion 103 is engaged by a hook portion 133a of a second operation plate 133 that is attached to the other of the side plates (the left side plate as viewed in FIG. 3) of the cassette container 2 for vertical movement with a slide guide pin 131 received in a slide guide hole 132.

A coil spring 134 pulls down the second operation plate 133 thereby urging the hook portion 133a to impart torque to the second lock release member 56 for clockwise rotation about the shaft 122. The protrusion 104 abuts a stopper (not illustrated) provided inside of the baring portion 121 to prevent further clockwise rotation of the second lock release member 56, which is subjected to clockwise torque by the coil spring 134 and the second operation plate 133, to hold it in a generally horizontal state.

The slide plate operation surface 105, which is formed on one side face of the second lock release member 56, has a slope so inclined downwards as to approach the above mentioned side plate 2a. Rotating counterclockwise the second lock release member 56 against the bias force of the coil spring 134 moves the second slide plate 91 against the bias of the coil spring 87 to the left, as viewed in FIG. 3, thereby releasing engagement of the second lock member 54 with the second guide member 52. The cassette contacting surface 106 is a slope that is so inclined in the inserting direction of the tape cassette as to gradually approach the bottom plate 2c of the cassette container 2. Upon insertion into the cassette container 2, the standard size tape cassette 301 presses at its leading end the cassette contacting surface 106, causing counterclockwise rotation of the second lock release member 56 thereby causing the slide plate operation surface 105 to move the second slide plate 91 to the left as viewed in FIG. 3. This results in release of engagement of the second lock member 54 with the second guide member 52.

Figure 8:
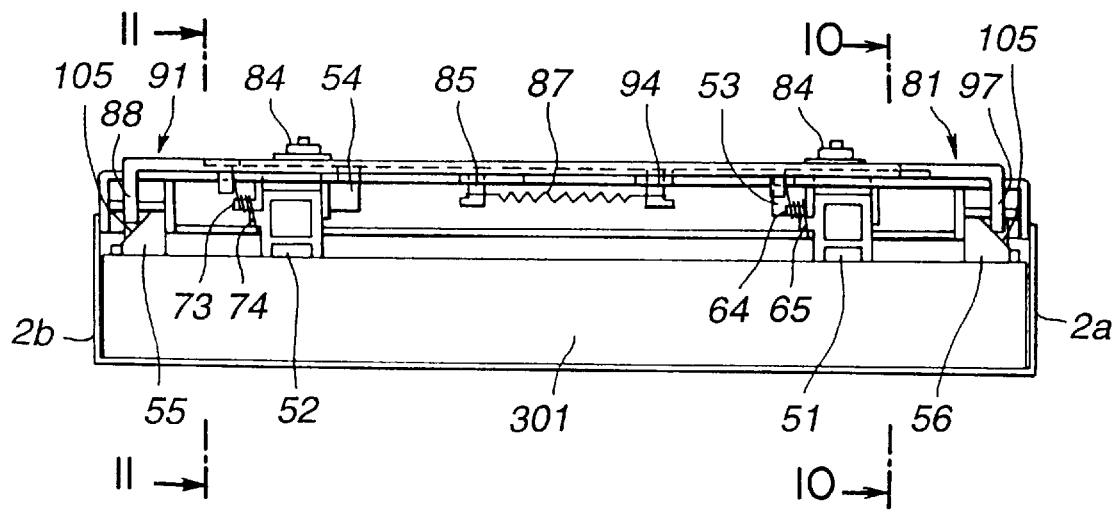
FIG. 8 shows a rear side of the pop-up cassette loading apparatus according to an embodiment of, the present invention during a loading operation for a standard size magnetic tape cassette.
Figure 9:
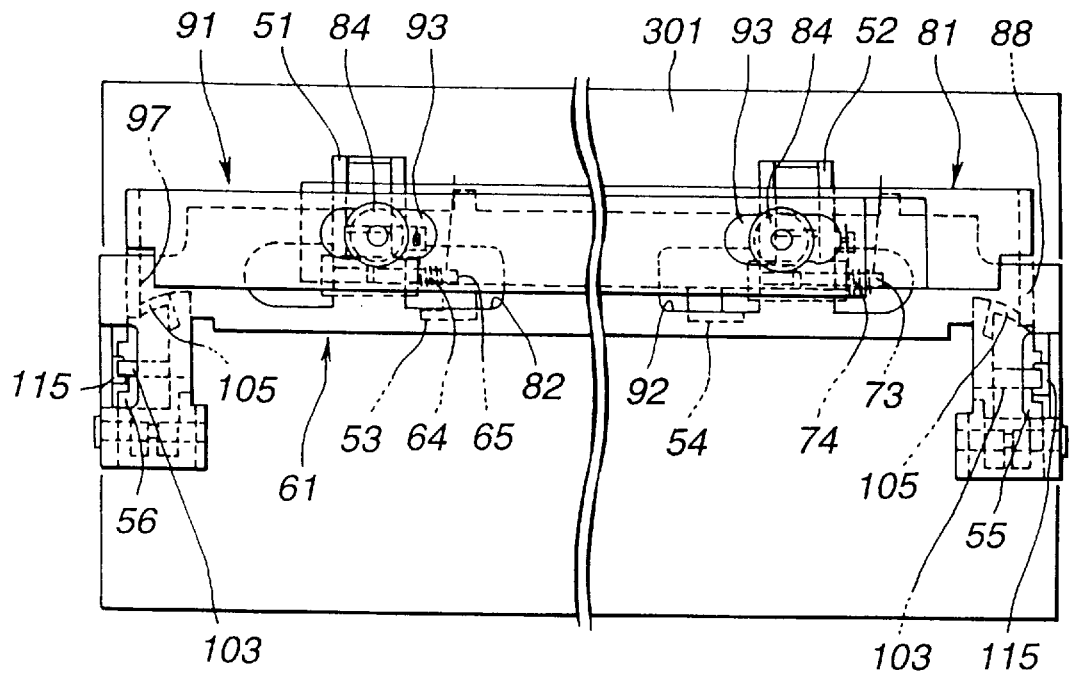
FIG. 9 is a plan view of the pop-up cassette loading apparatus during a loading operation for a standard size magnetic tape cassette.
Figure 10:
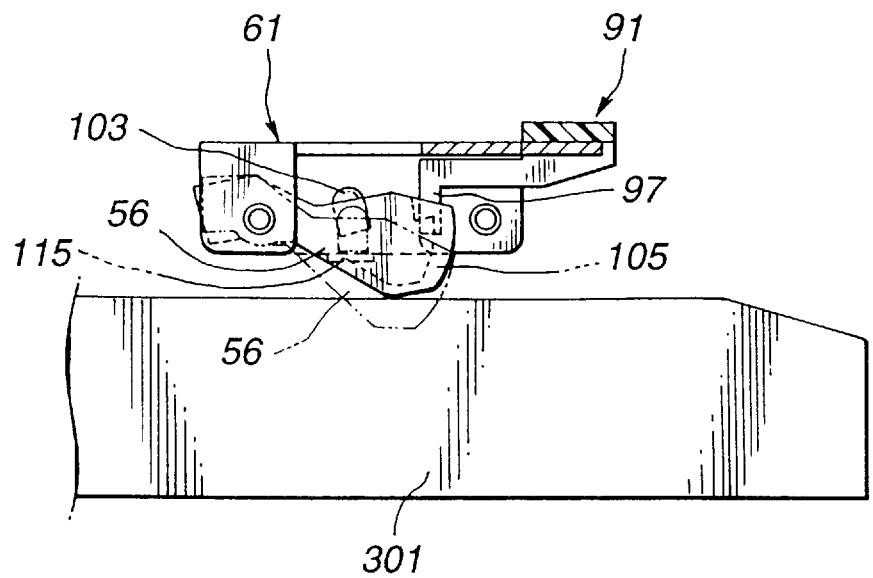
FIG. 10 is a cross-sectional view of FIG. 8 as viewed along line 10—10 of FIG. 8.
Figure 11:
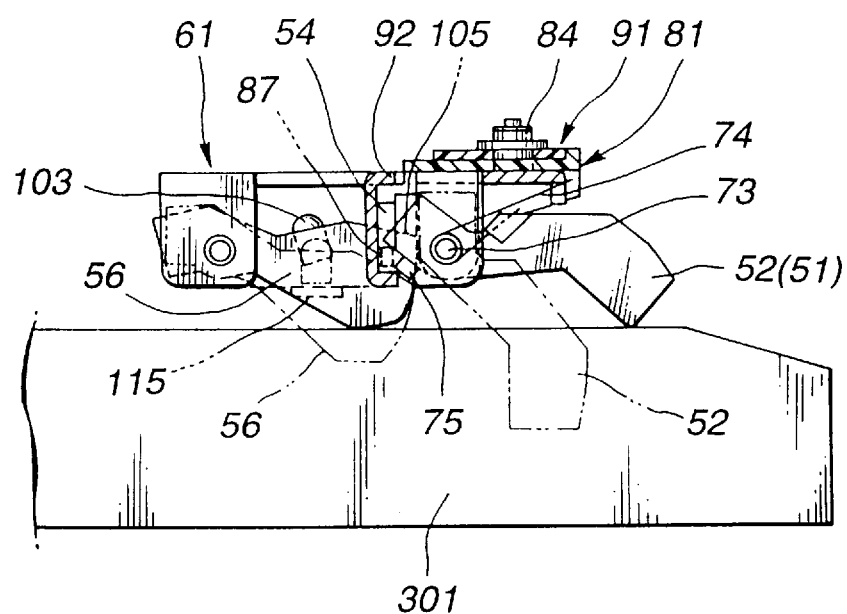
FIG. 11 is a cross-sectional view of FIG. 8 as viewed along line 11—11 of FIG. 8.

Next, operation of the cassette guide 7 is described. as FIG. 8 is a rear view of the cassette container 2 with the standard size tape cassette inserted. Its cross sectional views as viewed along lines 10—10 and 11—11 are shown in FIGS. 10 and 11, respectively. FIG. 9 shows a top plan view of the cassette container 2 with the standard size tape cassette inserted. As shown in these Figures, upon insertion into the cassette container 2, the standard size tape cassette 301 presses, at both side portions on the leading end thereof, the first and second lock release member 55 and 56 thereby causing the first and second lock release members 55 and 56 to rotate in such an escape direction as to allow further insertion of the standard size tape cassette 301. Such rotation in the escape direction of the first and second lock release members 55 and 56 causes the inclined slide plate operating surfaces 105 to move the first and second slide plates 61 and 91 thereby releasing engagement of the first and second lock members 53 and 54 with the first and second guide members 51 and 52. Thus, when the standard size tape cassette 301 is inserted further to abut at its leading end the first and second guide members 51 and 52, the first and second guide members 51 and 52, which have been unlocked, rotate in the escape direction to allow insertion of the standard size tape cassette 301 deeply into the cassette container 2.

Figure 4:
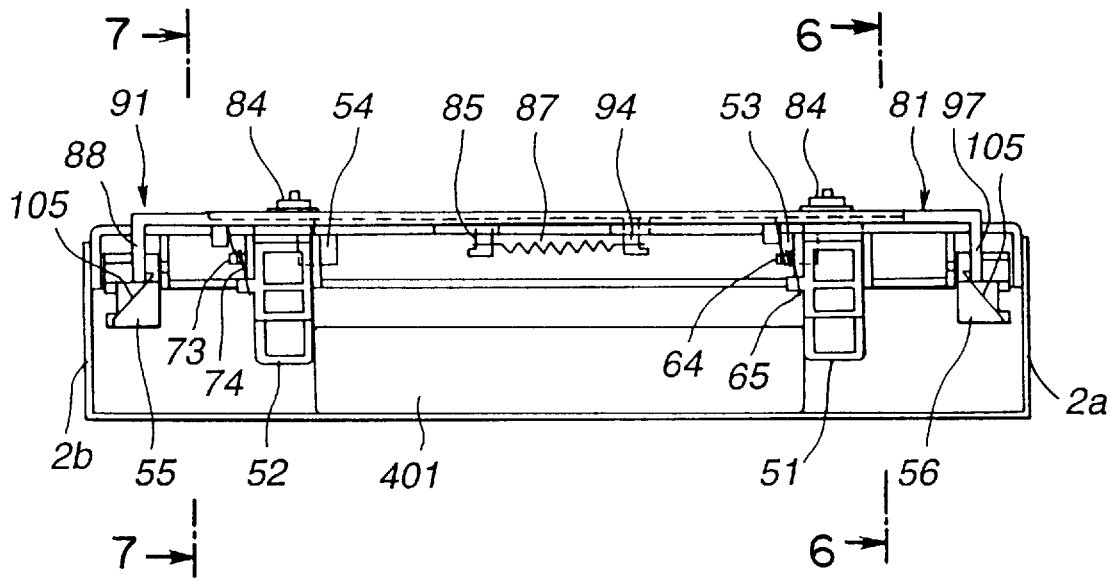
FIG. 4 shows a rear side of the pop-up cassette loading apparatus during a loading operation for a small size magnetic tape cassette.
Figure 5:
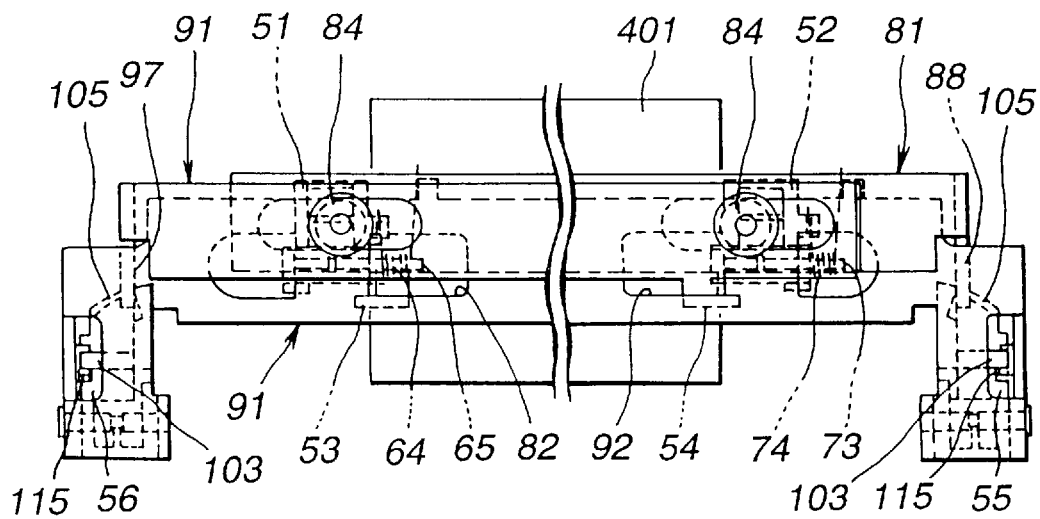
FIG. 5 is a plan view of the pop-up cassette loading apparatus during a loading operation for a small size magnetic tape cassette.
Figure 6:
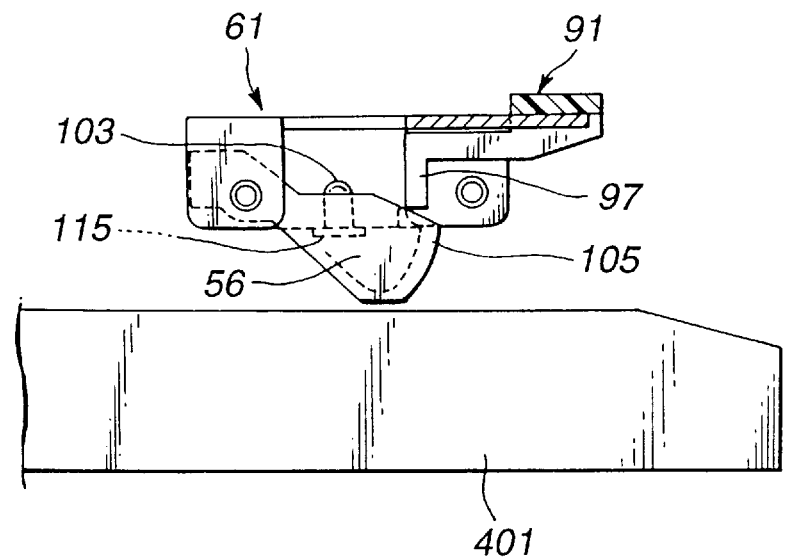
FIG. 6 is a cross-sectional view of FIG. 4 as viewed along line 6—6 of FIG. 4.
Figure 7:
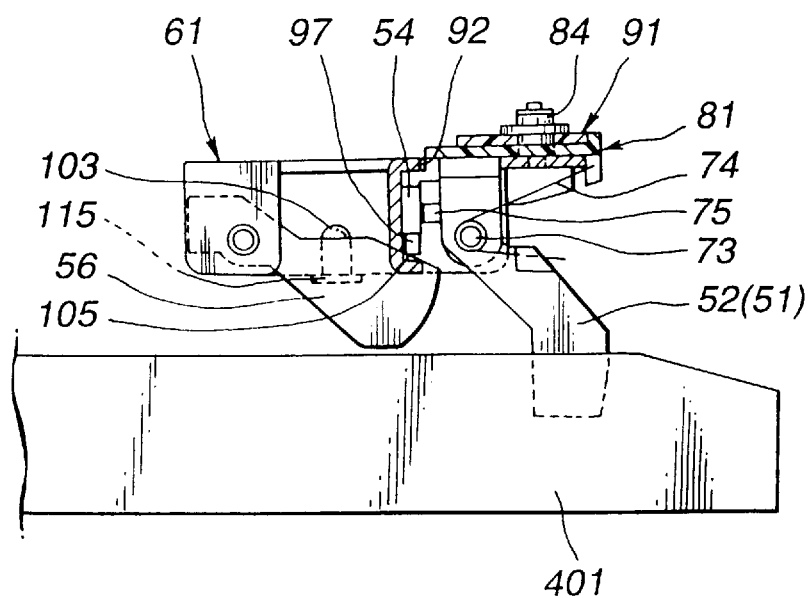
FIG. 7 is a cross-sectional view of FIG. 4 as viewed along line 7—7 of FIG. 4.

FIG. 4 shows a rear view of the cassette container 2 with the small sized tape cassette inserted. Its cross sectional views as viewed along lines 6—6 and 7—7 are shown by FIGS. 6 and 7, respectively. FIG. 5 shows a top plan view of the cassette container with the small size tape cassette inserted. As shown in these Figures, when the small size tape cassette 401 is inserted into the cassette container 2, the first and second lock release members 55 and 56 are not pressed thereby leaving the first and second guide members 51 and 52 held stationary by the first and second lock members 53 and 54. Thus, even if the leading end of the small size tape cassette 301 should abut the first and second guide members 51 and 52, the first and guide members 51 and 52 would remain stationary thereby continuously serving as a guide for the small size tape cassette 401 upon its insertion.

Description of Identifier 8

As shown in FIG. 12, the identifier 8 includes first and second cassette-in detection switches 141 and 142 that are attached to the inner side face of the first side plate 18. The first cassette-in detection switch 141 is pressed to turn on by a first switch operating mechanism 143 only when the standard size tape cassette 301 is inserted into the cassette container 2. The second cassette-in detection switch 142 is pressed to turn on by a second switch operating mechanism 144 when the standard size tape cassette 301 or the small size tape cassette 401 is inserted into the cassette container 2.

The first switch operating mechanism 143 includes a first pivot lever 145 and a second pivot lever 146. The first pivot lever 145 is pivotally connected via a shaft 147 to the first side plate 18 and biased to rotate in a clockwise direction as viewed in FIG. 12 by a bias force of a coil spring 148. The first pivot lever 145 has at its lower end portion a switch activating portion 149 that is arranged to press the first cassette-in detection switch 141 upon counterclockwise rotation of the first pivot lever 145 against the action of the coil spring 148. At an upper end portion thereof, the first pivot lever 145 has a pressure acting portion 150 that is arranged to be pressed by a lever activating portion 154 formed at a lower end portion of the second pivot lever 146, which is specifically described below.

The second pivot lever 146 is pivotally connected via a shaft 151 to the side plate 2b of the cassette container 2 and has at a portion adjacent the shaft 151 a spring retainer portion 152. The coil spring 114, which pulls down the first operating plate 113 attached to the side plate 2b of the cassette container 2 for vertical movement, is engaged at one end portion thereof with the spring retainer portion 152 thereby imparting torque to the second pivot lever 146 in a clockwise direction as viewed in FIG. 12. The second pivot lever 146, which is subjected to torque by the coil spring 114, has its spring retainer portion 152 engaged by a stopper protrusion 153 at one side portion of the first operation plate 113 to receive a reaction force tending to rotate the second pivot lever 146 counterclockwise thereby holding the lever activating portion 154 in spaced relation with the pressure acting portion 150 on the upper end portion of the first pivot lever 145.

With the first switch operating mechanism 143 constructed as previously described, inserting the standard size tape cassette 301 into the cassette container 2 causes one side portion thereof to rotate the first lock release member 55 in the escape direction. This rotation of the first lock release member 55 causes the first operation plate 113, which is engaged at its hook portion 113a with the first lock release member 55, to move upwards against the action of the coil spring 114. The coil spring 114 biases the second pivot lever 146 clockwise about the shaft 150. This clockwise rotational movement of the second pivot lever 146 causes the lever activating portion 154 to press the pressure acting area 150 of the first pivot lever 145.

This first pivot lever 145, which is pressed at its pressure acting area 150, rotates counterclockwise about the shaft 147 thereby causing the switch activating portion 149 to press the first cassette-in detection switch 142 to turn it on.

Figure 17:
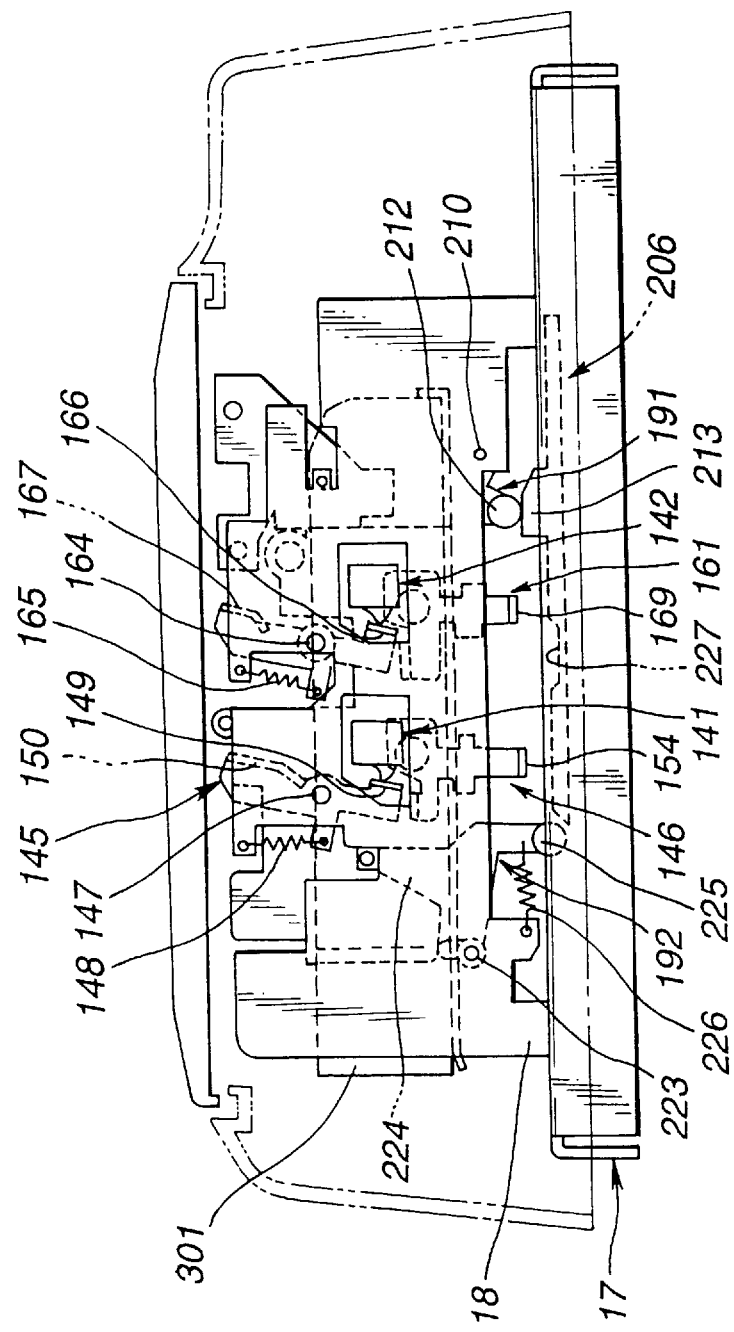
FIG. 17 is a side view showing a cassette loading operation of a magnetic tape cassette in a closed condition of the pop-up cassette loading apparatus.
Figure 18:
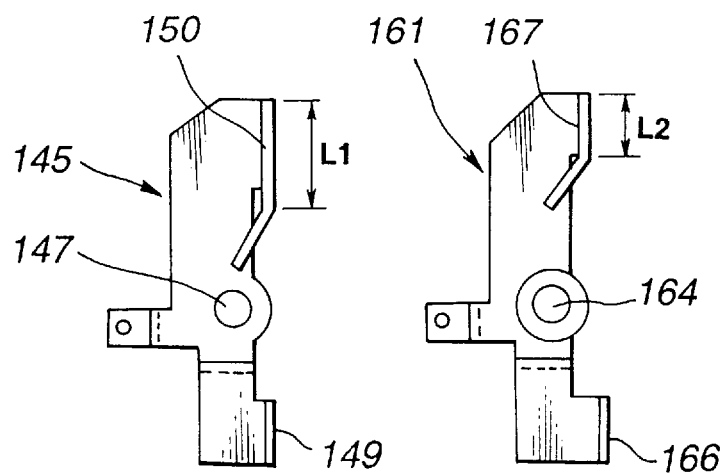
FIGS. 18A and 18B respectively show side views of a first and third rotational lever of the pop-up cassette loading apparatus according to an embodiment of the present invention.

The pressure acting portion 150 of the first pivot lever 145 assumes a vertical position when the first lever 145 turns on the first cassette-in detection switch 141. When the cassette container 2 is pressed down as shown in FIG. 17, the switch activating portion 149 of the lower end portion of the first pivot lever is disengaged from the first cassette-in detection switch 141. As shown in FIG. 18, the pressure acting area 150 of the first pivot lever 145 has a length L1 longer than a length L2 of a pressure acting portion 167 of a third pivot lever 161 that constitutes the second switch operating mechanism 144 thereby turning off the first cassette-in detection switch 141 after turning off the second cassette-in detection switch 142 in the process of pressing down the cassette container 2.

Next, the second switch operating mechanism 144 is described. As shown in FIG. 12, the second switch operating mechanism 144 includes a third pivot lever 161, a fourth pivot lever 162 and a fifth pivot lever 163. The third pivot lever 161 is pivotally connected via a shaft 164 to the first side plate 18 and biased to rotate in a clockwise direction as viewed in FIG. 12 by a to bias force of a coil spring 165. The third pivot lever 161 has at its lower end portion a switch activating portion 166 that is arranged to press the second cassette-in detection switch 142 upon counterclockwise rotation of the third pivot lever 161 against the action of the coil spring 165. At an upper end portion thereof, the third pivot lever 161 has a pressure acting portion 167 that is arranged to be pressed by a lever activating portion 169 formed at a lower end portion of the fourth pivot lever 162, which is specifically described below.

The fourth pivot lever 162 is pivoted via a shaft 168 to the side plate 2b of the cassette container 2. The fourth pivot lever 162 has at a lower end portion thereof a lever activating portion 169 that is arranged to engage the pressure acting portion 167 formed at the upper end portion of the third pivot lever 161 and it has at a portion adjacent the shaft 168 a spring retainer portion 170. A coil spring 171 is engaged at zone end portion thereof with the spring retainer portion 170 thereby imparting torque to the fourth pivot lever 146 in a clockwise as direction as viewed in FIG. 12. At the other end portion thereof, the coil spring 171 is engaged with a spring retainer portion 172 of the fifth pivot lever 163, which is specifically described below.

The fifth pivot lever 163 is pivotally attached via a shaft 173 to the side plate 2b of the cassette container 2 and biased by the coil spring 171 to rotate counterclockwise direction as viewed in FIG. 12. Biasing the fifth pivot lever 168 due to bias of the coil spring 171 causes a lever activating portion 174, which is formed at a lower end of a leading end portion (free end portion) of the fifth pivot lever 168, to bias the spring retainer portion 170 of the fourth pivot lever 162 to cause the fourth pivot lever 162 to rotate counterclockwise. This counterclockwise rotation of the fourth pivot lever 162 releases the bias on the pressure acting portion 167 of the third pivot lever 161 by the lever activating portion 169 of the fourth pivot lever 162 thereby allowing the third pivot lever 161 to rotate clockwise due to the action of the coil spring 165 to leave the second cassette-in detection switch 142 turned off.

Figure 19:
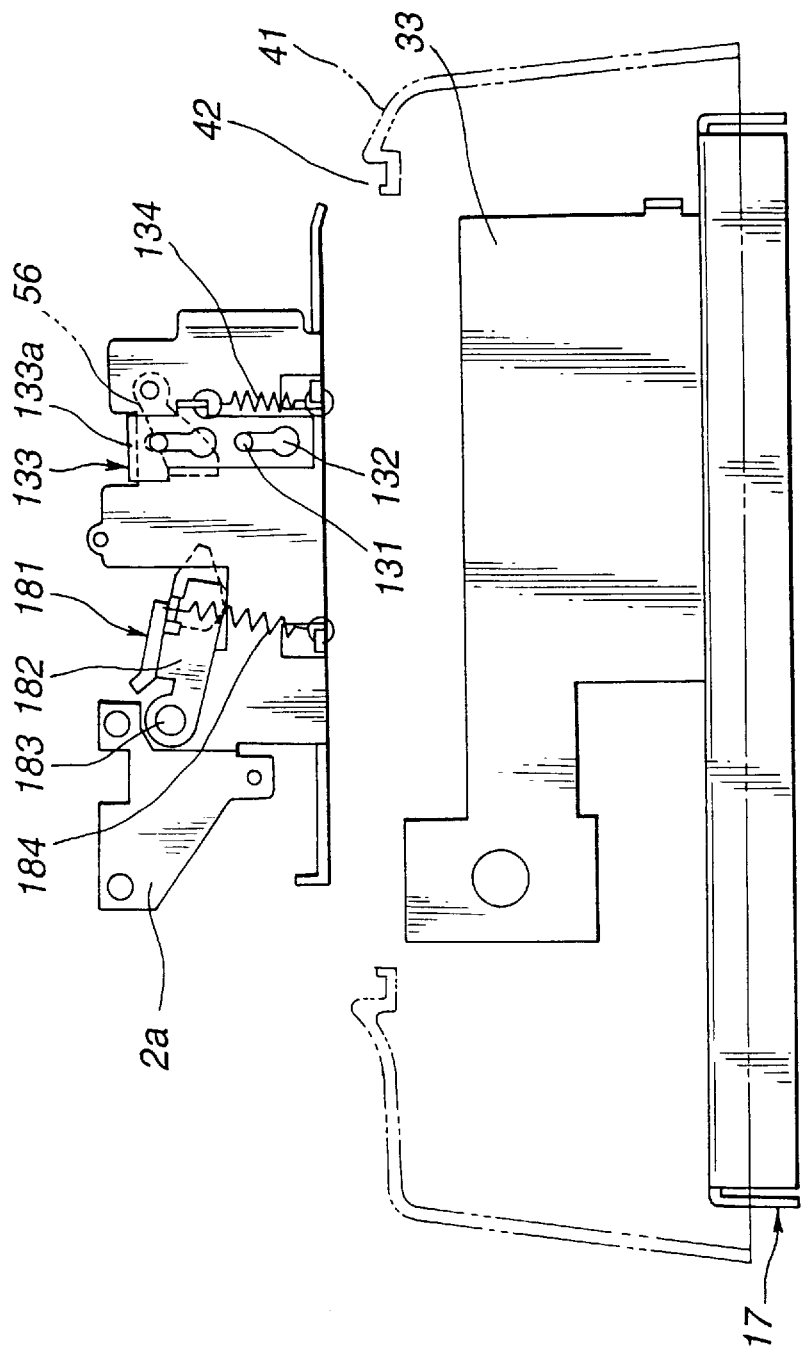
FIG. 19 is a simplified side view of the pop-up cassette loading apparatus illustrating operation of a sixth rotational lever thereof.

At one end portion thereof, a lever operating member 181 is attached to an upper portion of the fifth pivot lever is 163. The lever operating member 181 is operable upon insertion of the standard size tape cassette 301 or the small size tape cassette 401 to rotate the fifth pivot lever 163 clockwise against the bias of the coil spring 171. At the other end portion thereof, the lever operating member 181 is attached to an upper portion of a sixth pivot lever 182 as shown in FIG. 19, which cooperates with the fifth pivot lever 163 to form a pair. The sixth pivot lever 182 is pivotally connected via a shaft 183 to the side plate 2a of the cassette container 2 and biased by a coil spring 184 to rotate in a clockwise direction as viewed in FIG. 19. With its one end portion attached to the fifth pivot lever 163 and its other end attached to the sixth pivot lever 182, the lever operating member 181 is supported by the left and right side plates 2a and 2b of the cassette container 2.

As shown in FIG. 3, the lever operating member 181 is formed with first and second cassette contacting members 185 and 186 that project into the cassette container 2 from end portions on a lower surface of the lever operating member 181. The first and second cassette contacting members 185 and 186 are disposed behind the first and second lock release members 55 and 56 (downstream side with respect to the inserting direction of the tape cassette), The first and second contacting members 185 and 186 have at lower faces slopes 185a and 186a, respectively. Inserting the standard size tape cassette 301 into the cassette container 2 causes an upper surface thereof to abut the slopes 165a and 186a thereby lifting the first and second cassette contacting members 185 and 186 of the lever operating member 181 in accordance with the thickness of the tape cassette 301. When the cassette contacting members 185 and 186 are lifted by the standard size tape cassette 301, the fifth pivot lever 163 rotates clockwise, as viewed in FIG. 3, about the shaft 173 through a predetermined angle θ1 thereby releasing the bias on the spring retainer portion 170 of the fourth pivot lever 162 by the lever activating portion 174. The fourth pivot lever 162, which has been relieved from the bias, rotates clockwise, as viewed in FIG. 3, about the shaft 168 due to bias of the coil spring 171 thereby causing the lever activating portion 169 to bias the pressure acting portion 167 of the third pivot lever 161. This causes the third pivot lever 161 to rotate counterclockwise about the shaft 164, pressing the second cassette-in detection switch 142 to turn it on.

The lever operating member 181 is provided also with third, fourth and fifth cassette contacting members 187, 188 and 189, respectively on the lower surface thereof. The third cassette contacting member 187 is disposed at the center between the ends of the lever operating member 181. The fourth cassette contacting member 188 is disposed between the cassette contacting members 187 and 195, while the fifth cassette contacting member 189 is disposed between the cassette contacting members 187 and 186. The third, fourth and fifth cassette contacting members 187, 188 and 189 are disposed slightly behind the first and second guide members 51 and 52 and between them, and they have at their lower faces slopes 187a, 188a, and 189a, respectively. Inserting the small size tape cassette 401 into the cassette container 2 causes an upper surface thereof to abut the slopes 187a, 188a and 189a thereby lifting the third, fourth and fifth cassette contacting members 187, 188 and 189 of the lever operating member 181 in accordance with the thickness of the tape cassette 401. When the third, fourth and fifth cassette contacting members 187, 188 and 189 are lifted by the small size tape cassette 401, the fifth pivot lever 163 rotates clockwise, as viewed in FIG. 3, about the shaft 173 through a predetermined angle θ2 (θ2<θ1) against the bias of the coil spring 171 thereby allowing the fourth pivot lever 168 to rotate clockwise due to the bias of the coil spring 171 and the third pivot lever 161 to rotate counterclockwise. This counterclockwise rotation turns on the second cassette-in detection switch 142.

Figure 14:
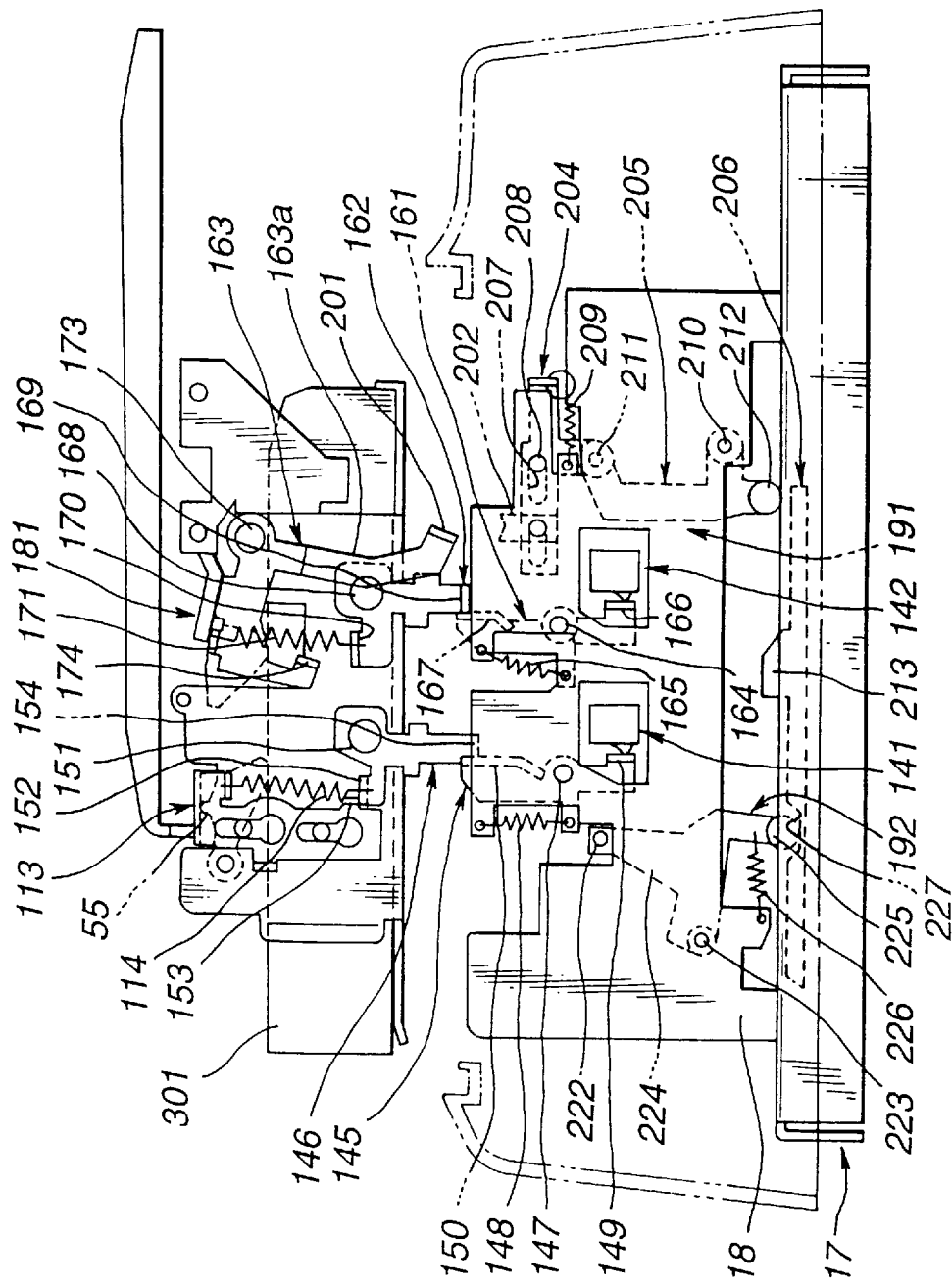
FIG. 14 is a side view illustrating a condition in which a second cassette detect switch for a standard size magnetic tape cassette has been activated.
Figure 15:
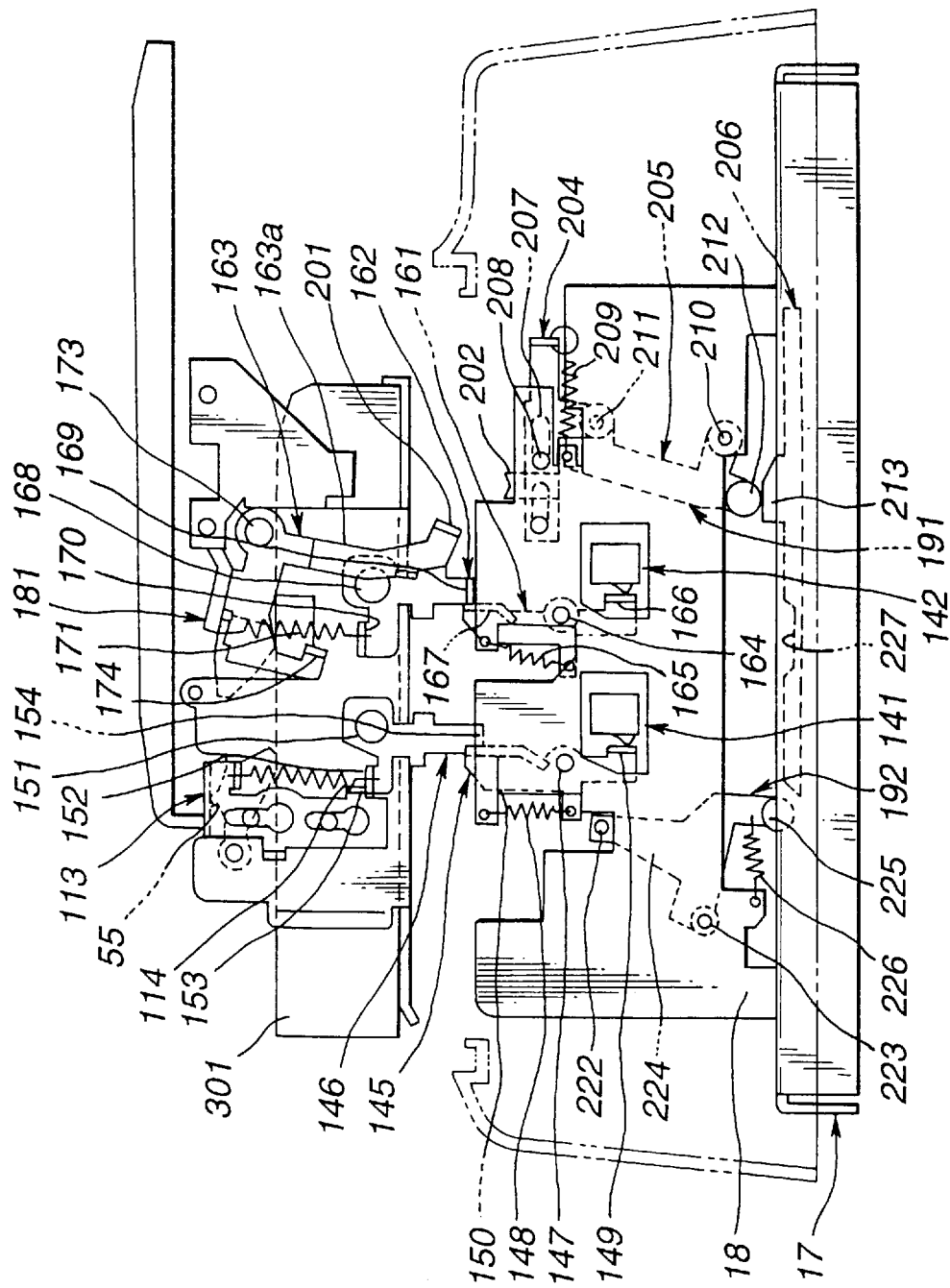
FIG. 15 is a side view showing a condition in which cassette reel mounting capstan movement for a standard size magnetic tape cassette is enabled.

Referring to FIG. 14, the pressure acting portion 167 of third pivot lever 161 stands generally vertically when the third pivot lever 161 turns on the second cassette-in detection switch 142. The pressure acting portion 167 disengages from the lever activating portion 169 of the fourth pivot lever 162 when the cassette container 2 is pressed down as shown in FIG. 17.

With the cassette identifier 8 described above, inserting the standard size tape cassette 301 into the cassette container causes the first and second switch operating mechanisms 143 and 144 to operate to turn on both of the first and second cassette-in detection switches 141 and 142. In response to detection of insertion of the standard size tape cassette 301 into the cassette container 2, a pair of capstans 5 and 6 are adjusted to a standard cassette position wherein the pair of capstans 5 and 6 are brought into alignment with the reels R1 and R2 of the standard size tape cassette 301.

Figure 16:
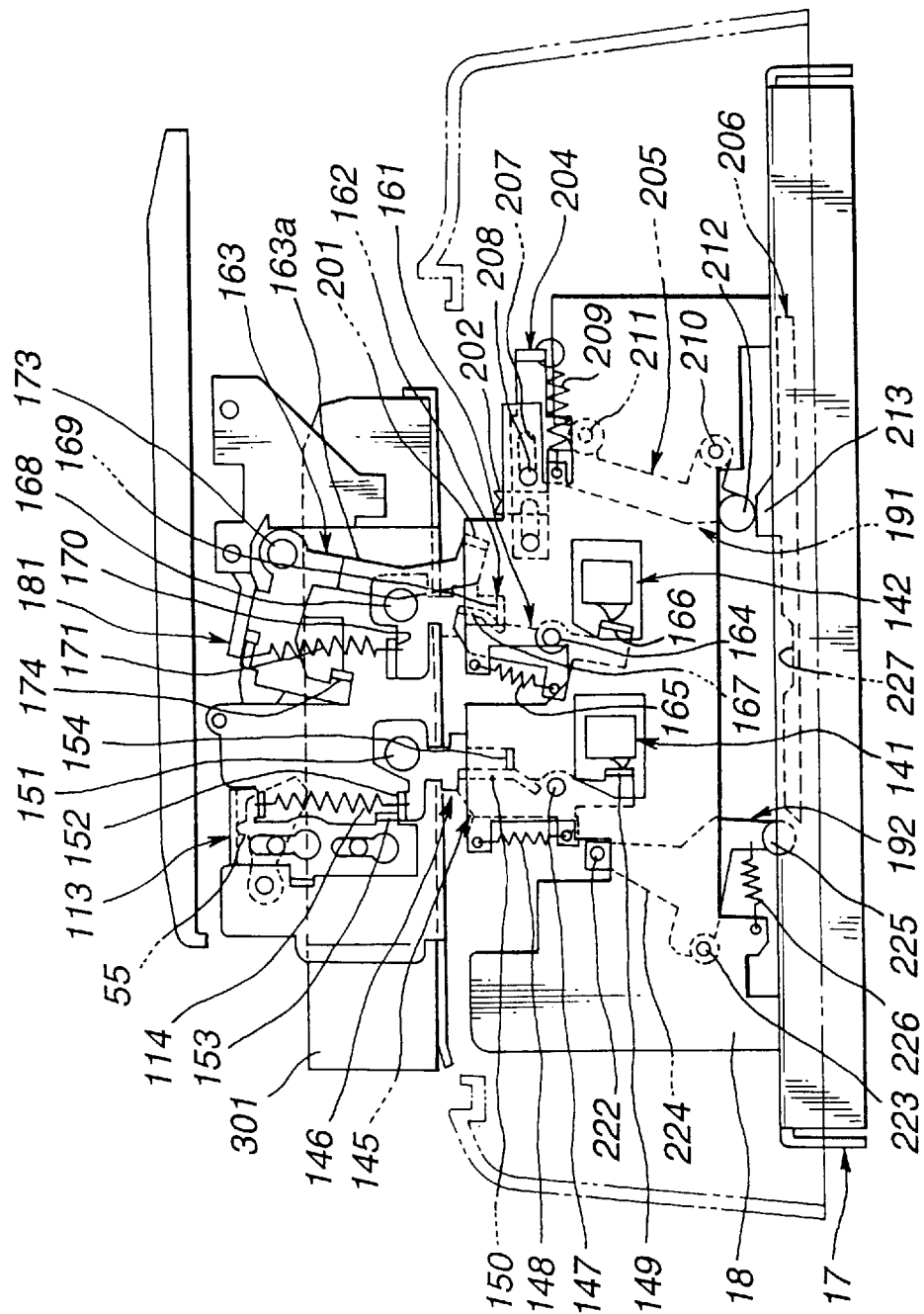
FIG. 16 shows a side view in which a closing operation of a cassette container portion of the pop-up cassette loading apparatus is enabled.

After adjustment to the standard cassette position, the cassette container 2 may be pressed down. As shown in FIG. 16, pressing the cassette container 2 down causes the lever activating portion 169 of the fourth pivot lever 162 of the second switch operating mechanism 144 to disengage from the pressure acting portion 167 of the third pivot lever 161 thereby allowing the third pivot lever 161 to rotate due to bias force of the coil spring 165 to turn off the second cassette-in detection switch 142. Further downward movement of the cassette container 2 toward the position as illustrated in FIG. 17 causes the lever activating portion 154 of the second pivot lever 146 of the first switch operating mechanism 143 to disengage from the pressure acting portion 150 of the first pivot lever 145 thereby allowing the first pivot lever 145 to rotate due to the bias of the coil spring 148 to turn off the first cassette-in detection switch 141. This downward movement causes the reels R1 and R2 of the standard size tape cassette 301 received in the cassette container 2 to fit around the capstans 5 and 6, respectively.

Figure 20:
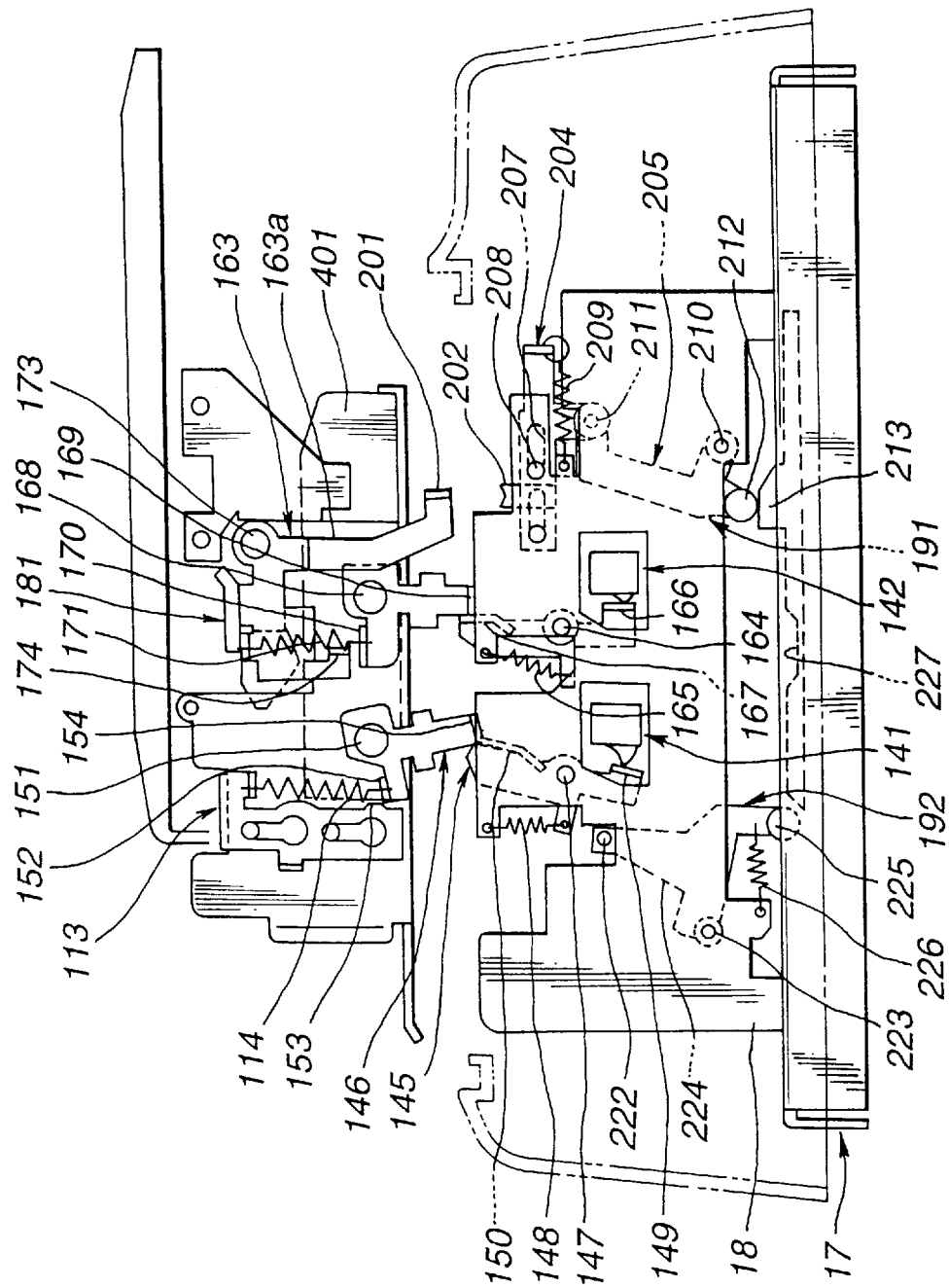
FIG. 20 is a cross-sectional side view showing an insert operation for a small size magnetic tape cassette into the cassette container portion.

As shown in FIG. 20, inserting the small size tape cassette 401 into the cassette container 2 does not activate the first switch operating mechanism 143 but it activates the second switch operating mechanism 144 thereby turning on the second cassette-in detection switch 142 only. In response to detection of the insertion of the small size tape cassette 401, a controller (not illustrated) controls adjustment of the pair of capstans 5 and 6 toward the small size position wherein the reels R1 and R2 are bought into alignment with the capstans 5 and 6, respectively.

Figure 21:
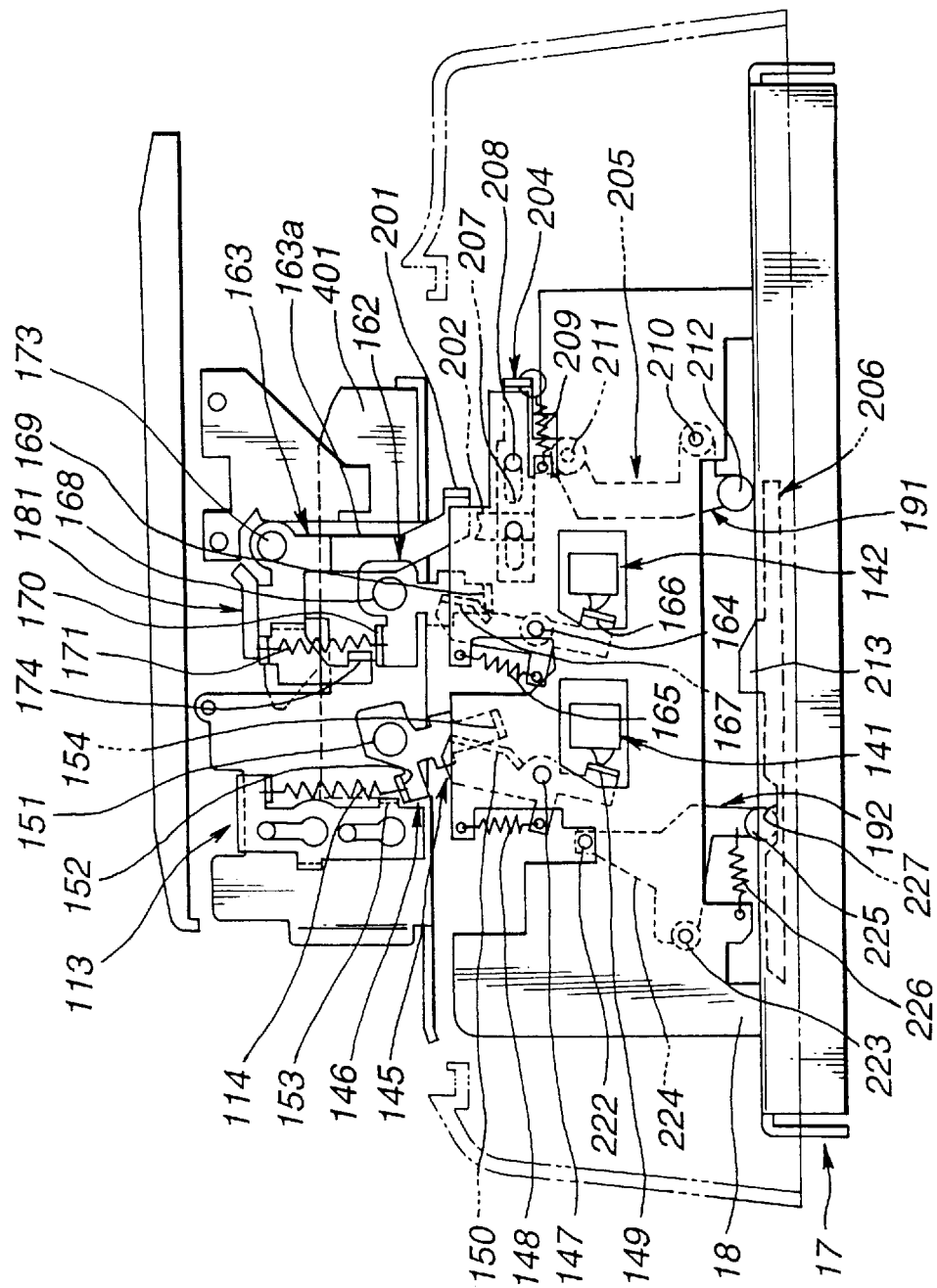
FIG. 21 shows a side view in which a closing operation of the cassette container portion of the pop-up cassette loading apparatus is enabled for a small size magnetic tape cassette.
Figure 22:
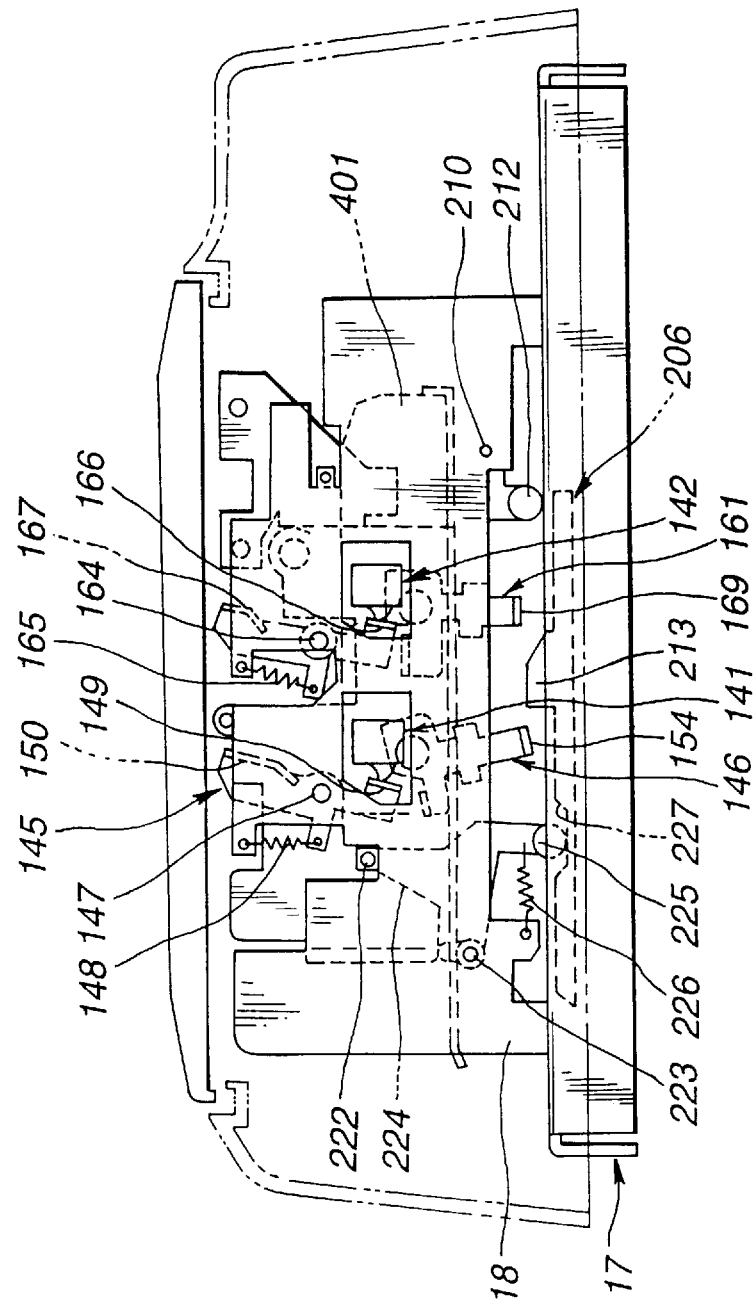
FIG. 22 is a side view showing a cassette loading operation for a small size magnetic tape cassette in a closed condition of the pop-up cassette loading apparatus.

After adjustment of the capstans to the small size position, pressing down the cassette container 2 causes the lever activating portion 169 of the fourth pivot lever 162 of the second switch operating mechanism 144 to disengage from the pressure acting portion 167 of the third pivot lever 161 thereby allowing the third pivot lever 161 to rotate due to bias of the coil spring 165 to turn off the second cassette-in detection switch 142 as shown in FIG. 21. When the cassette container 2 is pressed down to the cassette loading position as illustrated in FIG. 22, the reels R1 and R2 of the small size tape cassette 401 received in the cassette container 2 are brought into fit around the capstans 5 and 6, respectively, Description of Blocking Mechanism 9 to Prohibit Downward Movement of Cassette Container 2

The blocking mechanism 9 as shown in FIG. 12 is operable to prohibit downward movement of the cassette container 2 if the reels R1 and R2 of the tape cassette received in the cassette container 2 do not agree in position with the capstans 5 and 6 thereby preventing occurrence of damage of the reels R1 and R2 and/or capstans 5 and 6.

As mentioned before, when a tape cassette is inserted into the cassette container 2, the identifier 8 determines whether the inserted tape cassette is a standard size tape cassette or a small size cassette, causing the controller, not illustrated, to move the capstans 5 and 6 to move in accordance with the size of the tape cassette received in the cassette container 2. However, there is the case where the capstans 5 and 6 fall to move in accordance with a change in size of the tape cassette. This situation occurs when, for example, the apparatus is disconnected from a power source. According to the popup type cassette container, the cassette container 2 may be pressed down manually even in the case where the capstans 5 and 6 fail to move in accordance with a change in size of the tape cassette. Thus, one may insert the small size tape cassette 401 into the cassette container 2 and press down the cassette container 2 even if the capstans 5 and 6 are adjusted to the standard size position or one may insert the standard size tape cassette 301 into the cassette container 2 even if the capstans 5 and 6 are adjusted to the small size position. The cassette downward movement blocking mechanism 9 is operable in response to the above event to prevent the cassette container 2 from moving down to the tape cassette loading position thereby protecting the capstans 5 and 6 and the reels of the tape cassette against damage.

The blocking mechanism 9 includes a first cassette container downward movement prohibiting unit 191 and a second cassette container downward movement prohibiting unit 192. The first prohibiting unit 191 is operable to prevent the cassette container 2 from moving downwards when the capstans 5 and 6 are adjusted to the small size position even if the standard size tape cassette 301 is inserted into the cassette container 2 or when the capstans 5 and 6 are adjusted to the standard size position even if the small size tape cassette 401 is inserted into the cassette container 2. The second prohibiting unit 192 is operable to prevent downward movement of the cassette container 2 for a transient period during which the capstans 5 and 6 move between the standard size position and the small size position.

As shown in FIG. 12, the first prohibiting unit 191 is mounted for relative movement to the cassette container 2. The first prohibiting unit 191 includes a stopper 201 that can move to a first position (hereinafter referred to as an empty position) when no tape cassette is inserted into the cassette container 2, and to a second position (hereinafter referred to as a S position) when the small size tape cassette 401 is inserted into the cassette container 2, and also to a third position (hereinafter referred to as a L position) when the standard size tape cassette 301 is inserted into the cassette container 2. The first prohibiting unit 191 also includes a block 202 mounted on the chassis 17 which cooperates with the stopper 201 to prevent the cassette container 2 from moving down to the cassette loading position. The first prohibiting unit 191 further includes a driver 203 for moving the block 202 with movement of the capstans 5 and 6. The driver 203 positions the block 202 below the stopper 201 that takes the S position when the capstans 5 and 6 take the standard size position, The driver 203 positions the block 202 below the stopper 201 that takes the L position when the capstans 5 and 6 take the small size position.

The stopper 201 is attached to a leading end of an arm portion 163a of the fifth pivot arm 163 of the second switch operating mechanism 144 and thus can rotate about the shaft 178 between the S position and the L position with rotating movement of the arm portion 163a.

The driver 203 includes the block 202, a slide 204 for moving the block 202 between positions that are below the S position and the L position, respectively, a pivot lever 205 for moving the slide 204, and a lever operating member 206 for rotating the pivot lever 205.

Figure 23:
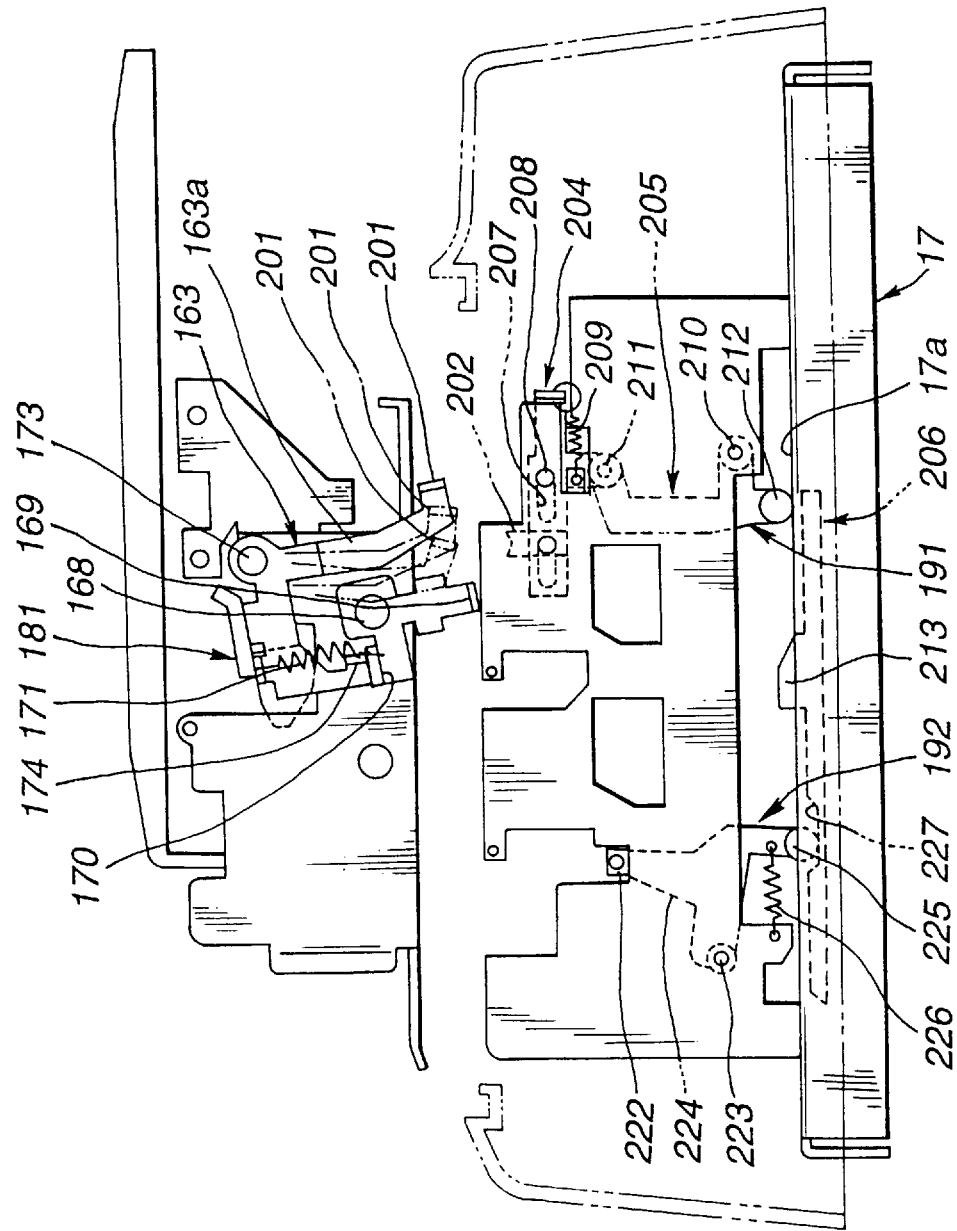
FIG. 23 is a cross-sectional side view showing a downward travel stopping portion at a lower side of the pop-up cassette loading apparatus according to an embodiment of the present invention.
Figure 24:
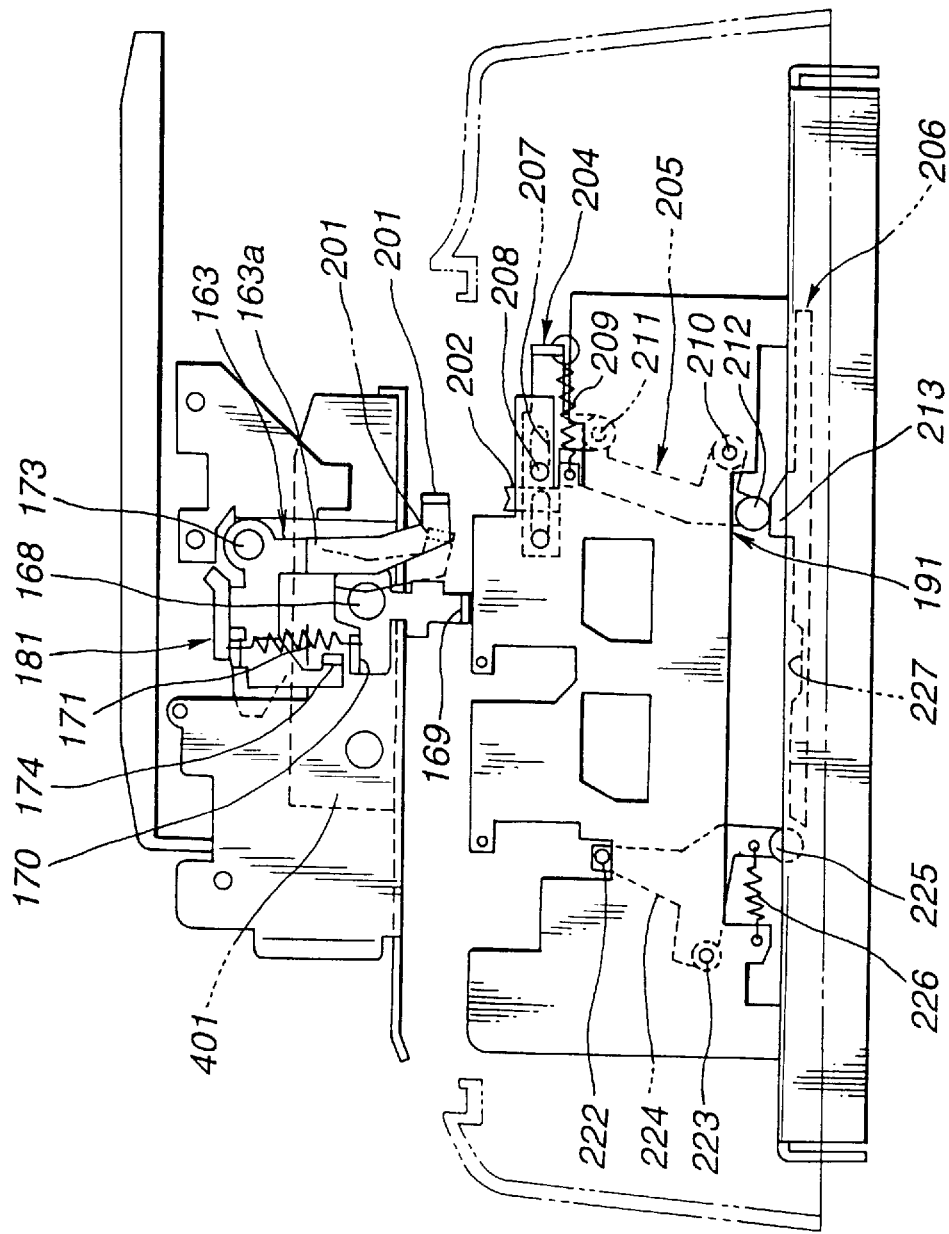
FIG. 24 is a simplified side view of an insert operation for a small size magnetic tape cassette into the cassette container portion.
Figure 25:
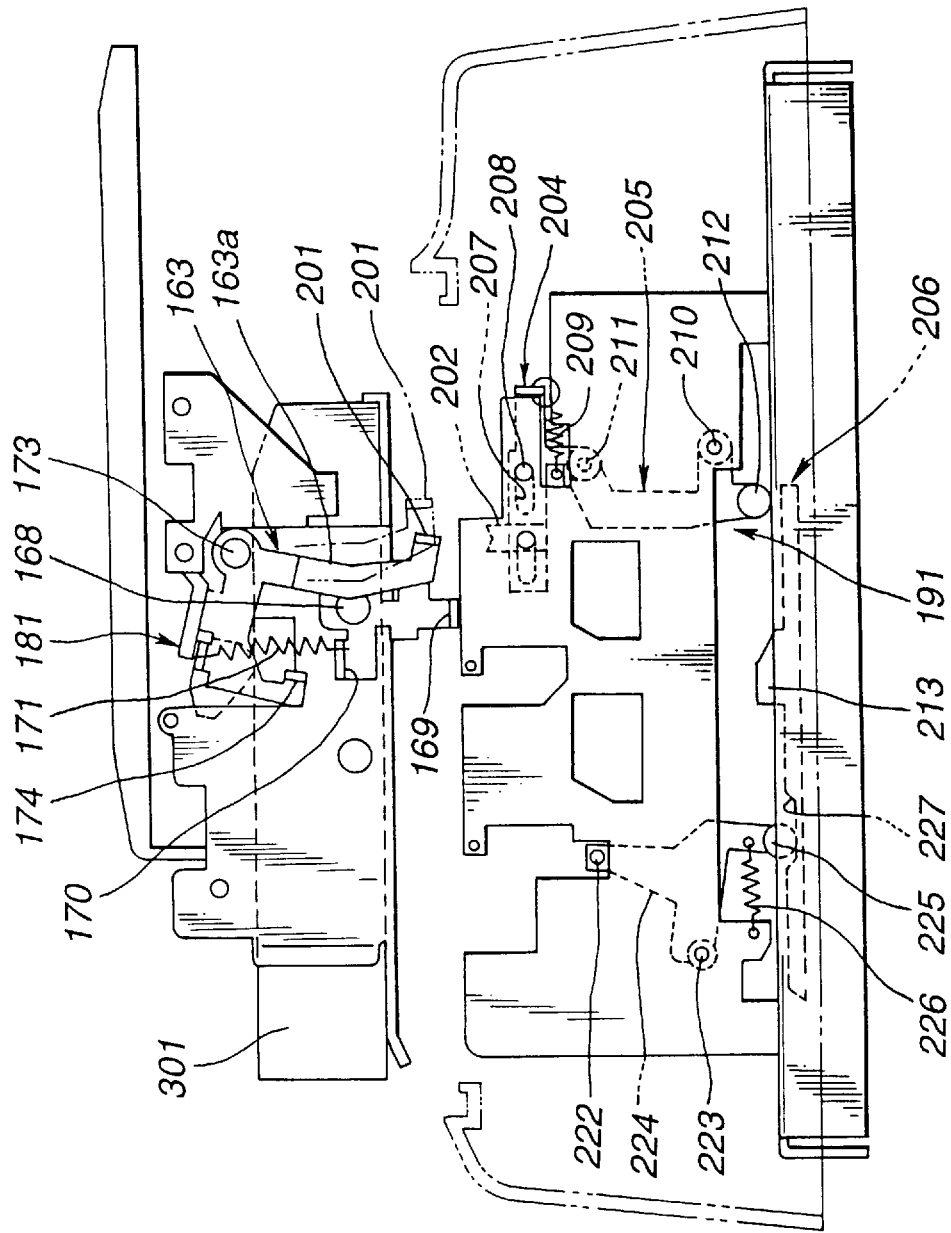
FIG. 25 is a simplified side view of an insert operation for a standard size magnetic tape cassette into the cassette container portion.

With a guide shaft 208 received in an elongate hole 207 that is formed through the side plate 18, the slide 204 is attached to the inner face of the side plate 18 of the chassis 17 for sliding movement relative to the chassis 17. A coil spring 209 biases the slide 204 to the left as viewed in FIG. 12. As shown in FIG. 23, when the slide 204 assumes the illustrated position wherein the right end of the elongate hole, as viewed in FIG. 23, abuts the guide shaft 208, the slide 204 positions the block 202 generally below the stopper 201 that takes the L position. As shown in FIG. 24, when the slide 204 assumes the illustrated position wherein the left end of the elongate hole 207 abuts the guide shaft 208, the slide 204 positions the block 202 generally below the stopper 201 that takes the S position.

The pivot lever 205 is pivoted via a shaft 210 to the side plate 18 of the chassis 17. The pivot lever 205 has at its upper end a pin 211 for operative connection with the slide 204 and at its lower end a roller 212.

When the stop 202 is positioned at a position other than the position right below the S position of the stopper 201 with the pivot lever 205 biased counterclockwise, as viewed in FIG. 23, by the coil spring 209, the roller 212 contacts the upper surface of the bottom plate 17a of the chassis 17. When a protrusion 213 of the lever operating member 206 lifts the roller 212, the pivot lever 205 rotates to move the slide 204 against the action of the coil spring 209 thereby moving the block 202 from a position right below the L position to a position right below the S position.

The lever operating member 206 includes the protrusion 213 for lifting the roller 212 and attached to the lower surface of the bottom plate 17a of the chassis 17 for sliding movement relative to the bottom plate 17a with its protrusion 213 projecting above the upper surface of the bottom plate 17a. The lever operating member 206 can move in cooperation with movement of capstans 5 and 6 by means of a capstan driver 230.

When the capstans 5 and 6 move from the small size position to the standard size position, the lever operating member 206 moves with this movement of the capstans 5 and 6, causing the protrusion 213 to move to the position of the roller 212 to lift the roller 212, rotating the pivot lever 205 against the action of the coil spring 209, causing the block 202 to the position right below the S position. In this position, the block 202 prevents the cassette container 2 from moving downwards when the small size tape cassette 401 is inserted into the cassette container 2 and the cassette container 2 is pressed down.

When the capstans 5 and 6 move from the standard size position to the small size position, the lever operating member 206 moves to the left, as viewed in FIG. 24, with this movement of the capstans 5 and 6, causing the protrusion 213 to disengage from the roller 212, allowing the coil spring 209 to move the slide 204 to position the block 202 right below the L position. In this position, the block 202 prevents the cassette container 2 from moving downwards when the standard size tape cassette 301 is inserted into the cassette container 2 and the cassette container 2 is pressed down.

Figure 26:
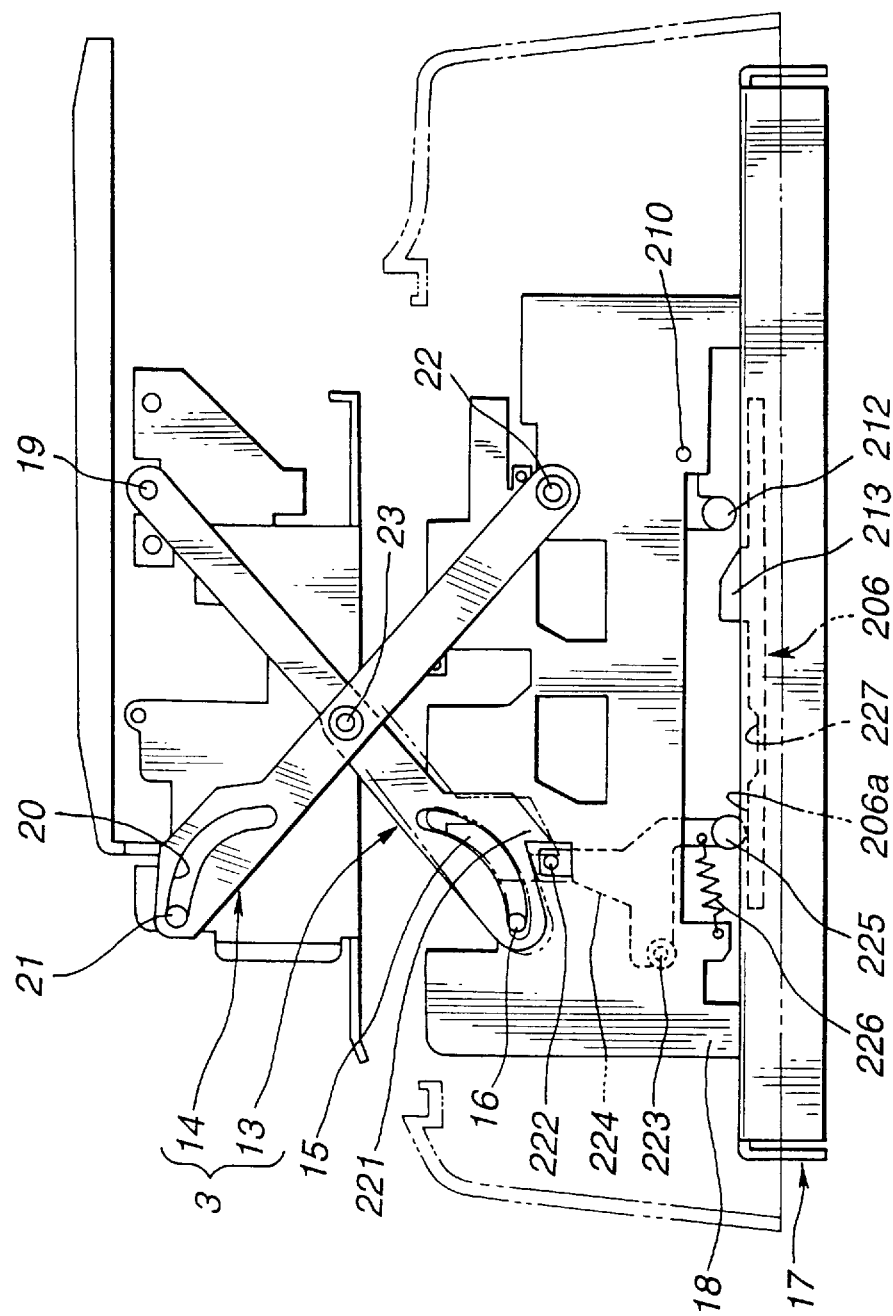
FIG. 26 is a simplified side view showing a second downward travel stopping portion of the pop-up cassette loading apparatus while tape reel capstan positional movement operation is enabled.
Figure 27:
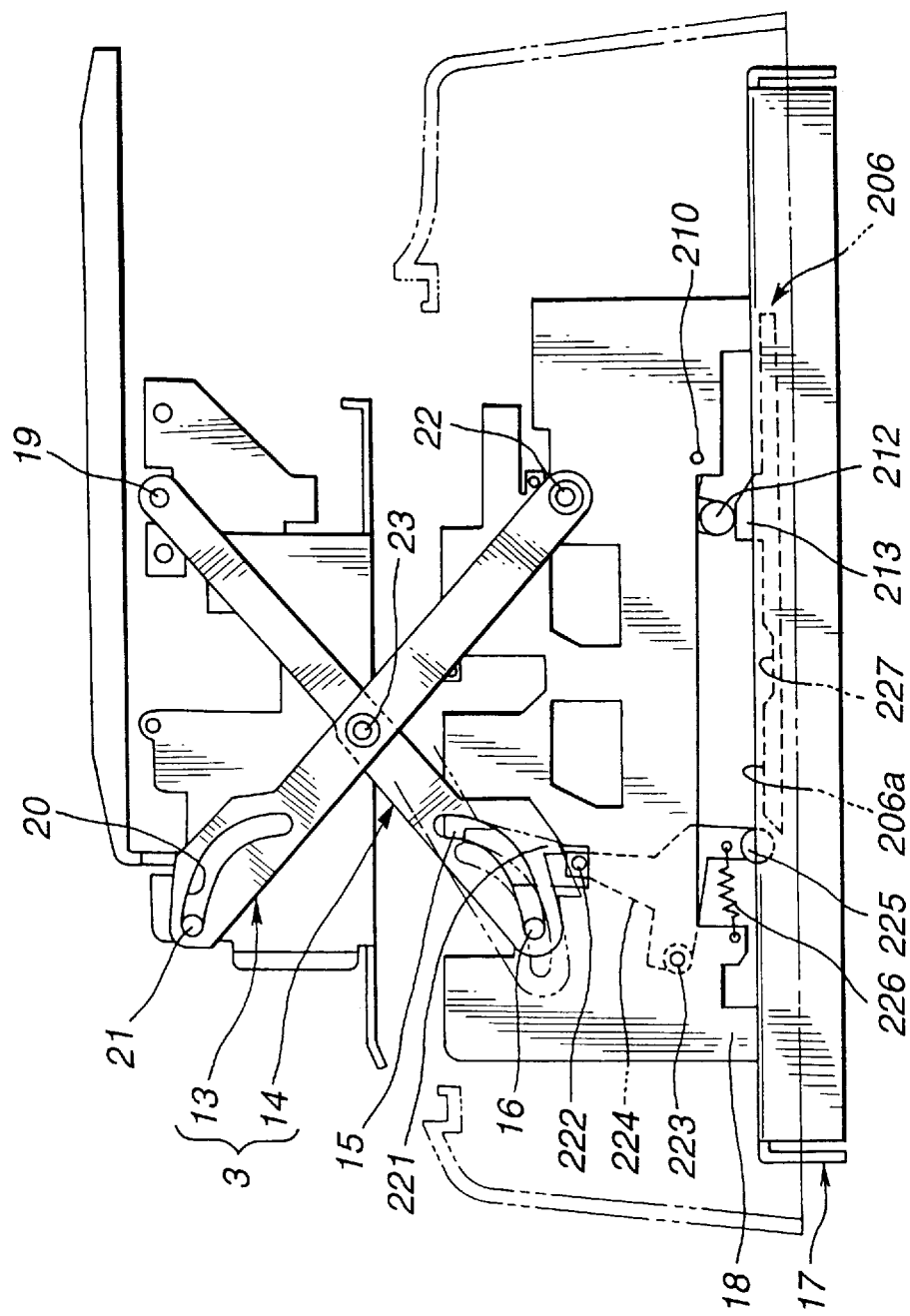
FIG. 27 is a simplified side view showing the first downward travel stopping means when tape capstan portions are positioned for a standard size magnetic tape cassette.
Figure 28:
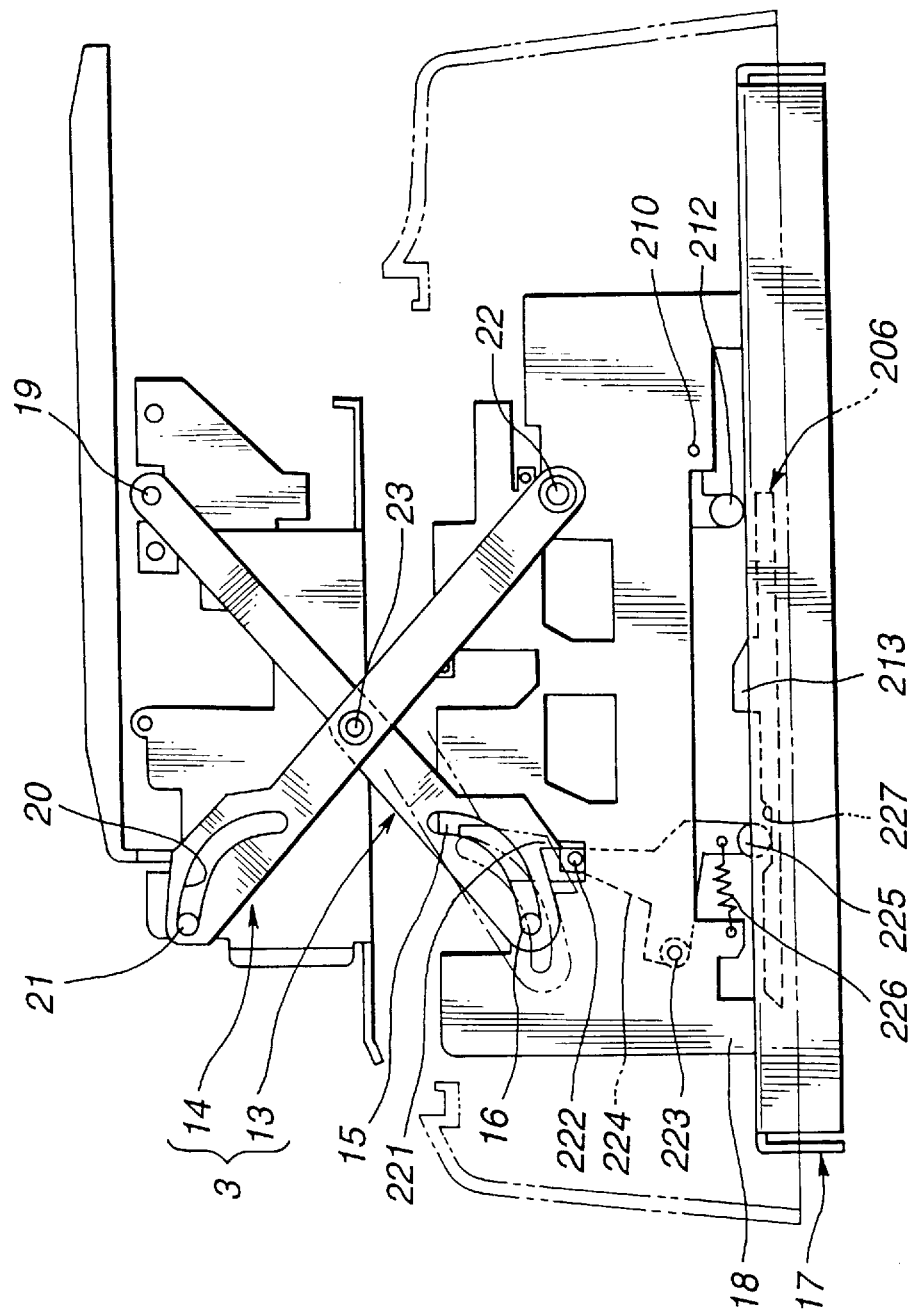
FIG. 28 is a simplified side view showing the second downward travel stopping means when tape capstan portions are positioned for a small size magnetic tape cassette.

Next, the second cassette container downward movement prohibiting unit 192 is described. Referring to FIGS. 26 to 28, the second prohibiting unit 192 is equipped with a stopper projection 221 formed adjacent the bearing hole 15 of the first pivot arm 13 of the first pantograph-like mechanism 13 and a stopper pin 222 that is arranged to abut the stopper projection 22 to prevent rotation of the first pivot arm 13 in such a direction as to allow downward movement of the cassette container 2.

The stopper pin 222 is attached to an upper end portion of a pivot lever 224. The pivot lever 224 has at its lower end portion a roller 225.

A coil spring 226 biases the pivot lever 224 in a clockwise direction as viewed in FIG. 26, pressing the roller 225 against an upper face 206a of the lever operating member 206. With the roller 225 pressed against the upper face 206a of the lever operating member 206, the pivot lover 224 is held at a position to provide an arrangement wherein pressing down the cassette container 2 brings the stopper pin 222 into engagement with the stopper projection 221.

When the capstans 5 and 6 assume the standard size position, the roller 225 disengages from the upper face 206a of the lever operating member 206 as shown in FIG. 27, allowing the coil spring 226 to rotate the pivot lever 224 clockwise as viewed in FIG. 27 to hold the pivot lever 224 at a position wherein the stopper pin 222 will not be engaged by the stopper projection 221. When the capstans 5 and 6 assume the small size position, the roller 225 is received in a recess 227 formed within the upper face of the lever operating member 206 to hold the pivot lever 224 at a position wherein the stopper pin 222 will not be engaged by the stopper projection 221.

With the second prohibiting unit 192, when the capstans 5 and 6 are moving between the standard size position and the small size position, the lever operating member 206 lifts at its upper face 206a the roller 225, causing the pivot lever 224 to rotate against the action of the coil spring 226 to hold the pivot lever 224 at the position wherein the stopper pin 222 is arranged to engage the stopper projection 221. Thus, if the cassette container 2 is pressed down while the capstans 5 and 6 are moving, the stopper projection 221 comes to engage the stopper pin 222 to prevent further rotation of the first pivot arm 13 of the first pantograph-like mechanism 3 in a direction as to allow downward movement of the cassette container 2.

Figure 29:
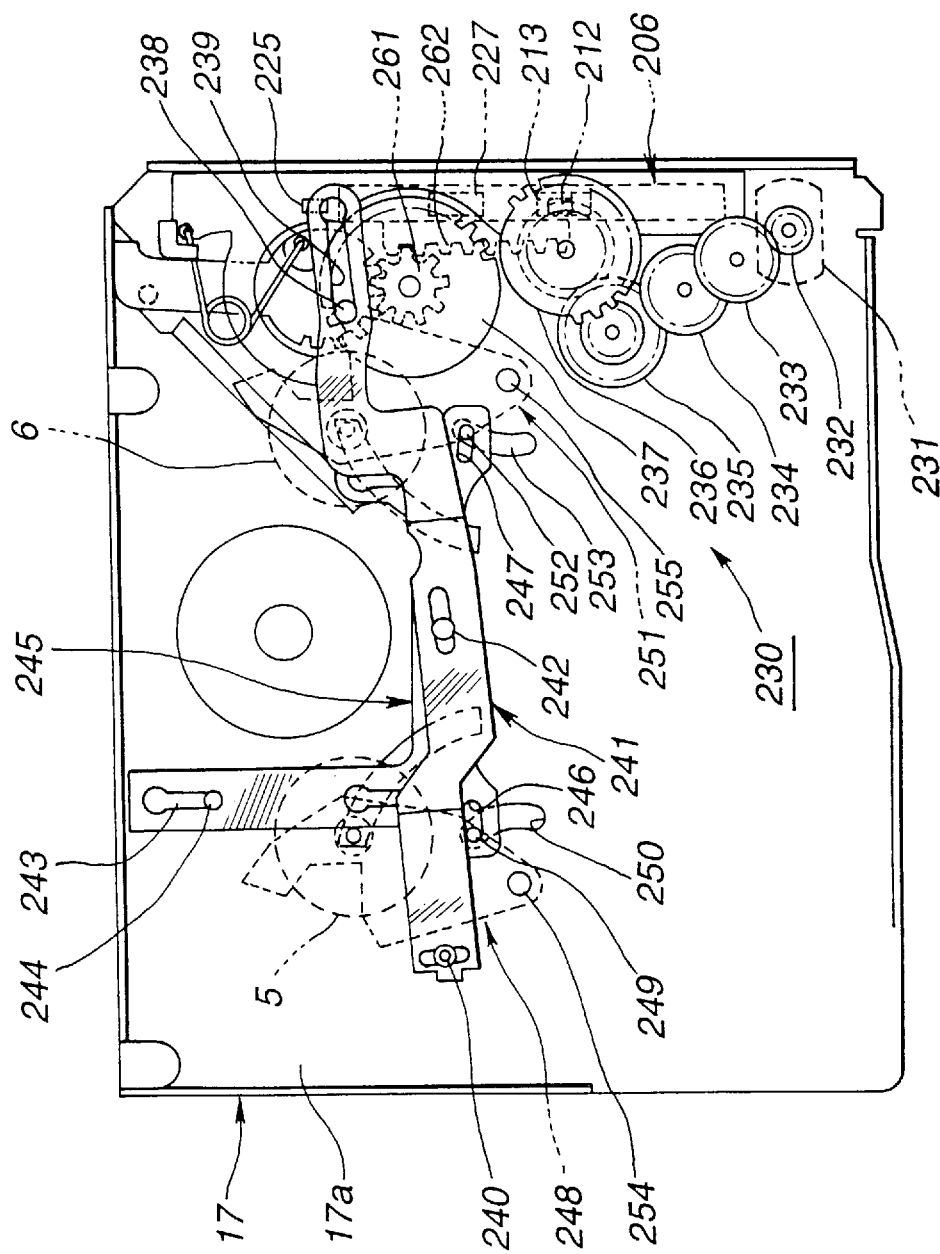
FIG. 29 is a plan view showing a position of a driving means for a capstan positional adjustment portion of the popup cassette loading apparatus when capstan portions are arranged for a standard sized magnetic tape cassette.
Figure 30:
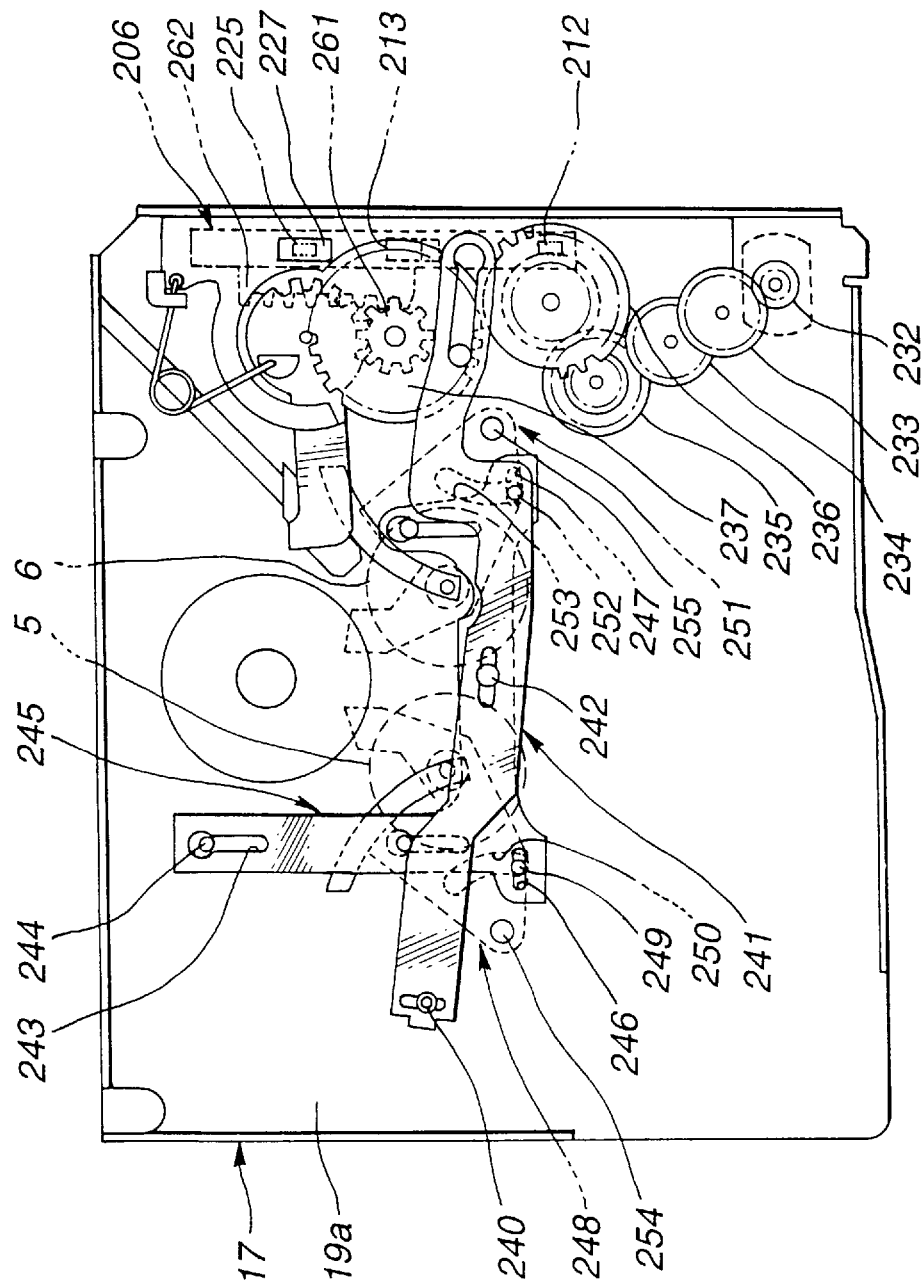
FIG. 30 is a plan view showing postioning of the driving means for the capstan positional adjustment portion of the pop-up cassette loading apparatus when capstan portions are arranged for a small sized magnetic tape cassette.

Next, the capstan driver 230 for moving the capstans 5 and 6 between the standard size position and the small size is described. Referring to FIGS. 29 and 30, the capstan driver 230 comprises a motor 231, a train of first to sixth gears 232, 233, 234, 235, 236 and 237, a pivot lever 241, and a generally U-shaped slide lever 245. The sixth gear 237 has a pin 238 received in an elongate hole 239 at one end portion of the pivot lever 241. A first shaft 240 fixed to the bottom plate 17a of the chassis 17 is received in a hole cut through the other end portion of the pivot lever 241. The pivot lever 241 is pivotally connected via the first shaft 240 to the lower face of the bottom plate 17a of the chassis 17 with its one end portion engaged with the sixth gear 237. With a second shaft 242, the slide lever 245 is coupled with the pivot lever 241. The slide lever 245 is attached to the lower face of the bottom plate 17a of the chassis 17 with slide guide elongate holes 243, 243 and guide pins 244, 244 for sliding movement relative to the bottom plate 17a.

The slide lever 245 has a pair of elongate holes 246 and 247 that are symmetrical about the second shaft 242. A pin 249 on a first capstan support plate 248 for supporting the capstan 5 extends through a first arched hole 250 formed through the bottom plate 17a of the chassis 17 into the elongate hole 246. A pin 252 on a second capstan support plate 251 for the capstan 6 extends through a second arched hole 253 of the bottom plate 17a into the other elongate hole 247.

The first capstan support plate 248 is pivotally connected via a shaft 254 to the bottom plate 17a of the chassis 17 with the pin 249 received in the first arched hole 260. As shown in FIG. 29, when the first capstan support plate 248 rotates to the illustrated position in which the pin 249 is engaged by one end of the first arched hole 250, the capstan 5 is held to the standard size position. As shown in FIG. 30, when the first capstan support plate 248 rotates to the illustrated position wherein the pin 249 is engaged by the other end of the first arched hole 250, the capstan 5 is held to the small size position.

Similarly to the first capstan support plate 248, the second capstan support plate 251 is pivotally connected via a shaft 255 to the bottom plate 17a of the chassis 17 with the pin 252 received in the second arched hole 253. When the second capstan support plate 251 rotates to a position as illustrated in FIG. 29 wherein the pin 252 is engaged by one end of the second arched hole 253, the capstan 6 is held at the standard size position. When the second capstan support plate 251 rotates to a position as illustrated in FIG. 30 wherein the pin 252 is engaged by the other end of the second arched hole 253, the capstan 6 is held at the small size position.

The sixth gear 237 has at its lower face a pinion 261, which meshes a rack 262 formed on one side of the lover operating member 206.

According to the capstan driver 230, when the motor 231 turns in one direction (to the right) from the position as illustrated in FIG. 29 wherein the capstans 5 and 6 assume the standard size position, the sixth gear 237 is driven via the first to fifth gears 232 to 236 to turn to the right. Turning the sixth gear 237 in this direction causes the pin 238 to move. This pin 238 moves within the elongate hole 239 until the sixth gear 237 turns through a predetermined angle, thus leaving the pivot lever 241 stationary. During this period, the sixth gear 237 functions to move tape guides, not illustrated, to predetermined positions. While the capstan driver 230 moves the capstans 5 and 6, the pinion 261 moves the lever operating member 206 of the blocking mechanism 9 with movement of the capstans 5 and 6.

Operation of the embodiment of the cassette loading apparatus is described below.

The small size tape cassette 401 inserted into the cassette container 2 is guided by a pair of left and right guide members 51 and 52 of the cassette guide 7 and set at the center portion within the cassette container 2. Further insertion of the small size tape cassette 401 causes its upper face at its leading end to lift the lever operating member 182. This lifting movement of the lever operating member 182 causes the fifth pivot lever 163 of the second switch operating mechanism 144 to rotate against the bias of the coil spring 17, causing the stopper 201 of the first cassette downward movement prohibiting unit 191 to move from the empty position to the S position together with rotation of the fifth pivot lever 163. The rotation of the fifth pivot lever 163 causes the fourth pivot lever 162 to rotate, causing the lever activating portion 174 on the lower end portion of the fourth pivot lever 162 to press the pressure acting portion 167 on the third pivot lever 161, thus causing the third pivot lever 161 to rotate to turn on the second cassette-in detection switch 142. When the second cassette-in detection switch 142 is turned on, the capstan driver 230 is activated to move the capstans 5 and 6 to the small size position. With movement of the capstans 5 and 6, the lever operating member 206 of the blocking mechanism 9 moves. When the capstans 5 and 6 have reached the small size position, the lever operating member 206 lifts at its protrusion 213 the roller 212 on the lower end portion of the pivot lever 205 of the first cassette container downward movement prohibiting unit 191, urging the pivot lever 205 to move the slide 204 to bring the block 202 to the position generally below the L position of the stopper 201 to avoid interference with the stopper 201 that assumes the S position. The roller 225 of the pivot lever 224 of the second cassette container downward movement prohibiting unit 192 is received in the recess 227 formed within the upper face of the lover operating member 206 at the other end portion remote from the protrusion 213, allowing the coil spring 226 to rotate the pivot lever 224 to hold the stopper pin 222 out of engagement with the stopper projection 221 on the pivot arm 13 of the second pantograph-like mechanism 3.

Thus, when the cassette container 2 with the small size tape cassette 401 is pressed down, the stopper 201 and the block 202 of the first cassette container downward movement prohibiting unit 191 will not contact with each other. Since stopper projection 221 and the stopper pin 222 of the second cassette container downward movement prohibiting unit 192 will not contact with each other, the cassette container 2 can move downwards to the cassette loading position.

If, with the capstans 5 and 6 held at the standard size position and the identifier 7 being inoperable owing to disconnection of the apparatus from the power source, the cassette container 2 with the small size tape cassette 401 therein is pressed down, the block 202 that is disposed below the S position abuts the stopper 201 to prevent further downward movement of the cassette container 2.

If the cassette container 2 is pressed down during movement of the capstans 5 and 6, the stopper projection 221 of the pivot arm 13 of the pantograph-like mechanism 3 abuts the stopper pin 222 to prevent further downward movement of the cassette container 2.

The standard size tape cassette 301 inserted into the cassette container 2 presses the first and second lock release members 55 and 56 of the cassette guide 7, releasing engagement of the first and second lock members 53 and 54 with the first and second guide members 51 and 52. The first and second guide members 51 and 52, which have been released, can rotate to allow insertion of the tape cassette 301 deeply into the cassette container 2. When the tape cassette 301 presses the first lock release member 551 the first operation plate 113 that is engaged at its hook 113a with the first lock release member 55 moves vertically upwards against the action of the coil spring 114, causing the second lever 146 to rotate to press, at the lever activating portion 154 thereof, the pressure acting portion 150 of the first pivot lever 145, causing the first pivot lever to rotate to press, at its switch activating portion 149, the first cassette-in detection switch 141 to turn it on. Further insertion of the tape cassette 301 causes the upper face at the leading end to lift the lever operating member 181, causing the fifth pivot lever 163 of the second switch operating mechanism 144 of the identifier 8 to rotate against the bias of the coil spring 171, thus moving the stopper 201 of the first cassette container downward movement prohibiting unit 191 to the L position. With the rotation of the fifth pivot lever 163, the fourth pivot lever 162 rotates, turning the third pivot lever 161 to rotate to turn on the second cassette-in detection switch 142. Thus, both the first and second cassette-in switches 141 and 142 are turned on when the standard size tape cassette 301 is inserted into the cassette container 2. Upon detection of insertion of the standard size tape cassette 301, both of the first and second cassette-in detection switches 141 and 142 are closed to activate the capstan driver 230, thus initiating movement of the capstans 5 and 6 to the standard size position. With movement of the capstans 5 and 6, the lever operating member 206 of the blocking mechanism 9 moves. When the capstans 5 and 6 have moved to the standard size position, the lever activating member 206 moves to disengage the protrusion 213 from the roller 212, allowing the pivot lever 205 to rotate, causing the slide 204 to move to position the block 202 at a position generally below the S position. At the same time, the upper face 206a of the lever operating member 206 disengages from the roller 225 of the pivot lever 224 of the second cassette container downward movement prohibiting unit 192, allowing the pivot lever 224 to rotate to hold the stopper pin 222 out of engagement with the stopper projection 221 of the first pivot arm 13 of the second pantograph-like mechanism 3.

Accordingly, when the cassette container 2 with the standard size tap cassette 301 inserted therein is pressed down, the stopper 201 and the block 202 of the first cassette container downward movement prohibiting unit 191 are not engaged and the stopper projection 221 and the stopper pin 222 of the second cassette container downward movement prohibiting unit 192 are not engaged. This allows the cassette container 2 to move down to the cassette loading position.

If, with the capstans 5 and 6 held at the small size position and the identifier 7 being inoperable owing to disconnection of the apparatus from the power source, the cassette container 2 with the standard side tape cassette 301 therein is pressed down,, the block 202 that is disposed below the L position abuts the stopper 201 to prevent further downward movement of the cassette container 2.

If the cassette container 2 is pressed down during movement of the capstans 5 and 6, the stopper projection 221 of the pivot arm 13 of the pantograph-like mechanism 3 abuts the stopper pin 222 to prevent further downward movement of the cassette container 2.

While the present invention has been illustrated and described with reference to the preferred embodiments of the present invention, it is to be understood that the invention is not to be limited to the precise construction herein disclosed and the right is reserved to all changes and modifications coming within the scope of the invention as defined in the appended claims.

What is claimed is:

1. A cassette loading apparatus comprising:

a cassette container including an identifier for identifying a kind of cassette inserted into said cassette container, said identifier assuming different positions corresponding to different kinds of cassettes that can be inserted into said cassette container;

a driver for driving an inserted cassette, the driver being adjusted to different positions corresponding to said different kinds of cassettes; and a first prohibiting unit operable to prohibit travel of said cassette container to a cassette loading position when a cassette inserted into said cassette container does not correspond with a position to which said driver is adjusted; and a second prohibiting unit selectively operable to prohibit travel of said cassette container to a cassette loading position for a transient period during which the driver is being adjusted.

2. A cassette loading apparatus as claimed in claim 1, wherein said first prohibiting unit is selectively operable to prohibit said travel of said cassette container in response to occurrence of a discrepancy between a position assumed by said identifier and a position which said driver is adjusted to.

3. A cassette loading apparatus as claimed in claim 1, wherein said first prohibiting unit cooperates with said driver and said identifier to selectively prohibit travel of said cassette container toward said driver.

4. A cassette loading apparatus as claimed in claim 1, wherein said first prohibiting unit assumes different positions in response to said different positions of said driver and cooperates with said identifier to prohibit said travel of said cassette container toward said driver to the cassette loading position unless a cassette inserted into said cassette container is fit for loading on said driver that is adjusted to one of said different positions thereof.

5. A cassette loading apparatus as claimed in claim 1, further comprising:

means for adjusting said driver to one of said different positions thereof which corresponds to one of said different positions assumed by said identifier; and position discriminating means for determining which one of said different positions said driver has been adjusted to.

6. A cassette loading apparatus as claimed in claim 5, wherein said position discriminating means comprises:

a first position discriminator operable to determine which position said driver has been adjusted to after completion of adjusting movement; and a second position discriminator operable to determine whether the driver is in the process of movement for adjustment.

7. A cassette loading apparatus as claimed in claim 1, wherein said first prohibiting unit comprises:

a stopper having different positions corresponding to said different positions of said identifier; and a block for moving with movement of said driver and arranged to abut said stopper to selectively prevent downward movement of said cassette container.

8. A cassette loading apparatus as claimed in claim 1, wherein said second prohibiting unit comprises:

an arm responsible for downward movement of said cassette container;

a stopper pin adapted for engagement with said arm to prevent motion of said arm; and a member arranged to move with movement of said driver to hold said stopper pin at a position for engagement with said arm.

9. A cassette loading apparatus as claimed in claim 1, wherein said identifier comprises:

a first portion for detecting a width of a cassette inserted into said cassette container.

10. A cassette loading apparatus as claimed in claim 9, wherein said identifier comprises:

a second portion for detecting a thickness of said cassette inserted into said cassette container.

* * * * *